US007421412B2

(12) United States Patent
Ramanathan

(10) Patent No.: US 7,421,412 B2
(45) Date of Patent: Sep. 2, 2008

(54) COMPUTERIZED METHOD AND SYSTEM FOR MONITORING USE OF A LICENSED DIGITAL GOOD

(76) Inventor: Kumaresan Ramanathan, 29 Chadwick Cir. #F, Nashua, NH (US) 03062

( * ) Notice: Subject to any disclaimer, the term of this patent is extended or adjusted under 35 U.S.C. 154(b) by 544 days.

(21) Appl. No.: 10/390,837

(22) Filed: Mar. 18, 2003

(65) Prior Publication Data
US 2003/0177074 A1 Sep. 18, 2003

Related U.S. Application Data

(60) Provisional application No. 60/365,095, filed on Mar. 18, 2002, provisional application No. 60/418,866, filed on Oct. 15, 2002, provisional application No. 60/375,862, filed on Apr. 26, 2002.

(51) Int. Cl.
*G06Q 99/00* (2006.01)
(52) U.S. Cl. .............................. 705/59; 705/50; 705/51; 705/57; 726/27; 726/30; 380/201; 380/202; 380/203
(58) Field of Classification Search ............. 705/50–59; 726/27–33; 380/201–203
See application file for complete search history.

(56) References Cited

U.S. PATENT DOCUMENTS 5,790,664 A * 8/1998 Coley et al. ................. 709/203

| 6,343,280 | B2 * | 1/2002 | Clark .......................... 705/55 |
| 6,697,948 | B1 * | 2/2004 | Rabin et al. .................. 726/30 |
| 6,810,389 | B1 * | 10/2004 | Meyer ......................... 705/59 |
| 2002/0082997 | A1 * | 6/2002 | Kobata et al. ................. 705/51 |

OTHER PUBLICATIONS

"Building Secure Software: Race Conditions",Nov. 2, 2001, Inform IT, pp. 1-12.*

* cited by examiner

*Primary Examiner*—Jalatee Worjloh
(74) *Attorney, Agent, or Firm*—Grossman Tucker Perreault & Pfleger, PLLC

(57) ABSTRACT

A method and system are provided for monitoring use of a licensed digital good, such as software, digital audio or video, text, and web pages. Each licensed digital good is associated with a shared resource, such as a record in a remote database in a license server. The shared resource is updated with data, such as a sequence or periodic transmission, from each instance of the licensed digital good when each instance is used. By detecting if the data in the shared resource has experienced a race condition, the use of multiple instances of the licensed digital good is detected. The method and system can also be used to determine a number of unlicensed uses of the digital good for purposes of automatically selling additional licenses.

12 Claims, 28 Drawing Sheets

Application1 is launched at time=0. Serial number is Y 12 minutes after this application is launched, at time=12 send serial number to license server Application 2 is launched at time=14 Serial number is Y 11 minutes after this application is launched, at time=25 send serial number to license server 14 minutes after the last communication with the license server, at time = 26 send serial number again.

11 minutes after the last communication with the license server, at time=37 send serial number to the license server again.

14 minutes after the last communication with the license server, at time = 39 send serial number again.

11 minutes after the last communication with the license server, at time = 50 send serial number to the license server again.

14 minutes after the last communication, at time=51 send serial number to license server.

Fig 7

COMPUTERIZED METHOD AND SYSTEM FOR MONITORING USE OF A LICENSED DIGITAL GOOD

CROSS-REFERENCES TO RELATED APPLICATIONS

The present invention claims the benefit of U.S. Provisional Applications Ser. No. 60/365,095 filed on Mar. 18, 2002, Ser. No. 60/418,866 filed on Oct. 15, 2002, and Ser. No. 60/375,862 filed on Apr. 26, 2002, which are fully incorporated herein by reference.

TECHNICAL FIELD

This invention relates to monitoring the use of a licensed digital good and more particularly, relates to technology for automating sales and ecommerce transactions for digital goods by monitoring and verifying licenses for use of digital goods.

BACKGROUND INFORMATION

The term ecommerce broadly refers to technology that automates sales transactions. When a consumer goes to an ecommerce website and orders goods, the consumer's credit card may be automatically charged to purchase the goods. The shipment of the goods is also coordinated by automated systems that track the goods from the supplier to the customer.

B2B ecommerce refers to the automation of transactions between businesses. For example, a supplier automatically tracks production schedules at a manufacturer and automatically ships required supplies to the manufacturer. The manufacturer automatically pays the supplier for goods received. Though consumer-facing (B2C) ecommerce is more widely known, the bulk of ecommerce transactions are between businesses.

Ecommerce with physical goods is straightforward. When goods are received, the vendor is paid. With digital goods, the situation is different. The vendor usually owns copyrights and other rights over the intellectual property (IP). The purchaser is only buying (or licensing) the right to use the goods in some well-defined manner. For example, a music company will own rights to music. A purchaser is buying rights to consume the music in some particular manner. For example, a retail customer who purchases a CD containing music is buying the rights to listen to the music in private, but not to broadcast it over wireless. The vendor who owns the IP may be concerned that the purchaser will misuse the digital goods. So the vendor usually wishes to monitor how the digital goods are being used. Accordingly, there is a need for ecommerce technology that allows licenses to be monitored for compliance.

When there is a close relationship between the supplier and the customer, the customer usually does not mind if the supplier asks for the right to inspect the customer's business activities to make sure that they are in compliance with the license agreement for the digital goods. When the business relationship is very loose, however, the customer may consider it an invasion of privacy. For example, a retail customer who purchases a music CD may not want the music company to audit him/her to check license compliance.

A large number of licenses may also be difficult to track. A customer business that buys 100 licenses for software from a software supplier may not want to keep track of compliance among its different departments. The use of an audit to monitor license compliance can create a tense relationship between the supplier and customer. Some customers may buy more licenses than is necessary to avoid an invasive audit. Accordingly, there is a need for technology that automatically monitors license usage so that payment may be collected for extra usage.

The current technology for enforcing digital usage licenses is usually too restrictive. For example, a customer who buys a digital e-book often cannot move the book to another computer. The book is "locked" to the consumer's original computer. Similarly anti-piracy technology such as "product-activation" makes it difficult to transfer software from one computer to another. These restrictions are usually resented by consumers.

The protection of IP is the foundation of business transactions involving digital goods. Minimizing piracy protects the content-owner (or IP owner). Allowing the content to be made portable from device to device protects the content-buyer. Accordingly, there is a need for antipiracy technology that allows content to be easily transferred from one device to another.

SUMMARY

According to one aspect of the present invention addressing the needs discussed above, a computerized method is provided for monitoring use of a licensed digital good capable of having multiple instances on multiple digital devices. The method comprises the steps of associating a licensed digital good with a shared resource such that each instance of the licensed digital good is associated with and communicates with the shared resource. When each instance of the licensed digital good is used on one of the digital devices, the shared resource is updated with data from each instance of the licensed digital good associated with the shared resource. The update of data in a shared resource by more than one process often results in unexpected results referred to as "race conditions." When a race condition is detected in the shared resource, it indicates that more than one instance of the digital good has been used.

In one embodiment, this method may be used to protect software applications. A software application updates a record in a database that is indexed by the application's serial number. The updates are made using a well-defined protocol. The database is accessed over the internet and is shared by all instances of the application. When two or more applications are run with the same serial number, they update the same record in the database. Unsynchronized updates of shared resources often result in race-conditions which produce unpredictable results in the database record. A race condition occurs only if two or more instances of the application are run with the same serial number. Once race-conditions are detected, steps can be taken to disable unlicensed instances of the application.

According to another aspect of the present invention, a license server is provided for monitoring use of a licensed digital good capable of having multiple instances on multiple digital devices. The license server comprises a shared resource corresponding to each licensed digital good. The license server receives data from each instance of the licensed digital good when each instance of the licensed digital good is used on one of the multiple digital devices. The license server updates the shared resource using the data received from each instance of the licensed digital good. The license server detects if the data in the shared resource has experienced a race condition such that the race condition indicates use of a plurality of instances of the licensed digital good.

According to another aspect of the present invention, a method for monitoring uses of a licensed digital good comprises associating a licensed digital good with a shared resource such that each instance of the licensed digital good is associated with and communicates with the shared resource. An identifier is computed to uniquely identify each instance of the licensed digital good. The shared resource is updated with data from each instance of the licensed digital good associated with the shared resource when each instance of the licensed digital good is used on one of the digital devices. The data includes information about when each instance of the licensed digital good was first created and information about when each instance of the licensed digital good was last used. The method computes the number of simultaneous instances of the licensed digital good created before a specified time but used after the specified time.

In accordance with another aspect of the present invention, a computer program that can monitor use of a licensed good comprises code for generating data using a race condition protocol and code for initiating communication with a shared resource corresponding to the licensed digital good to update the share resource with the data such that a race condition is caused only when two or more computer programs update the same shared resource.

In accordance with another aspect of the present invention, a computer-program that can monitor use of a licensed software application comprises code for executing the software application, code for generating a data value using a protocol that is suitable for causing race conditions, and code for initiating communication with a shared resource that corresponds to the software application, so that the shared resource updates itself with the data value. In this situation, a race condition is caused when multiple instances of the licensed software application update the shared resource.

BRIEF DESCRIPTION OF THE DRAWINGS

These and other features and advantages of the present invention will be better understood by reading the following detailed description, taken together with the drawings wherein:

FIG. 7 is a timeline illustrating one example of communications sent by multiple instances of a licensed digital good as shown in FIG. 5.

DETAILED DESCRIPTION OF THE PREFERRED EMBODIMENTS

A number of sub-processes are described herein as being part of an overall ecommerce process. Each of these sub-processes or methods and the systems that implement these methods can also be used independently. The preferred embodiment enables secure ecommerce for digital goods and coordinates licensed business activities by assuring vendors (and owners of IP) that their rights will be protected and by allowing consumers to enjoy the rights they have purchased with minimal inconvenience or loss of privacy.

Figure 1:
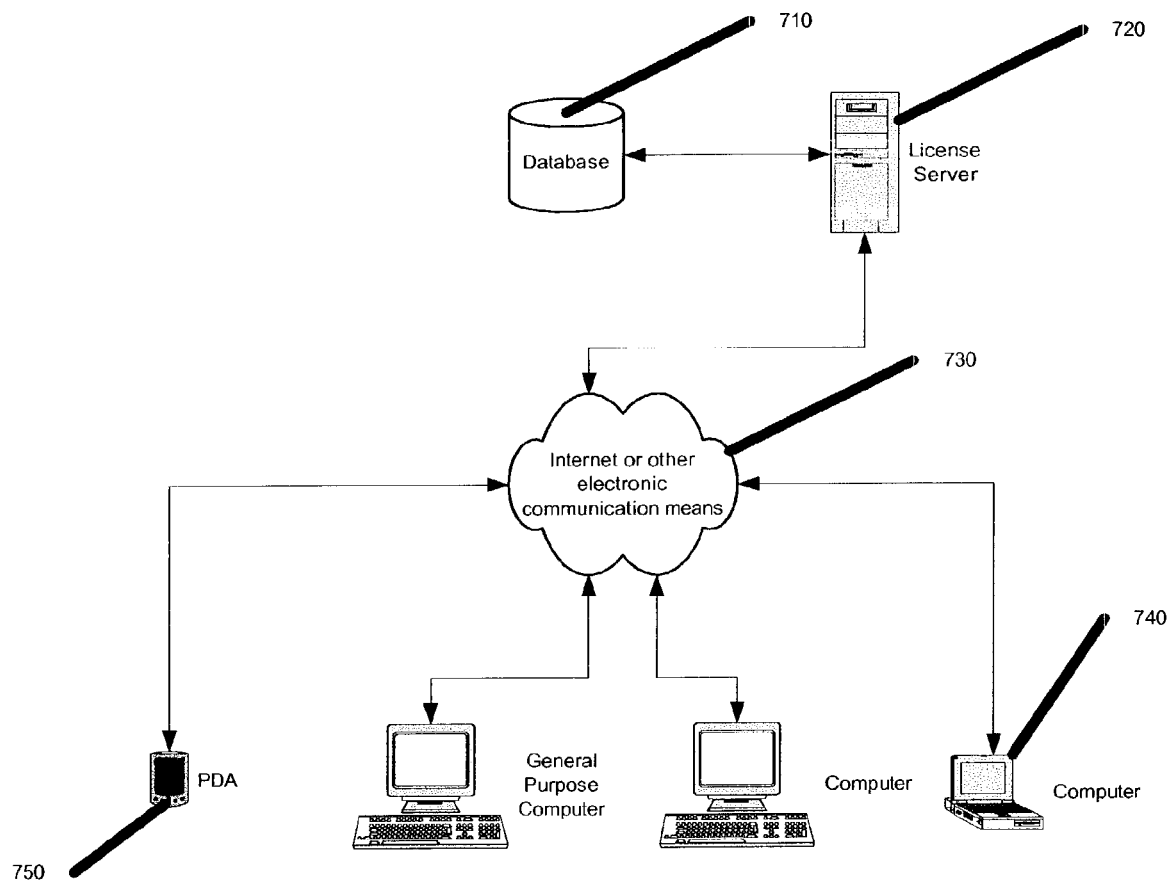
FIG. 1 is a schematic diagram of a system for monitoring use of licensed digital goods.
Figure 2:
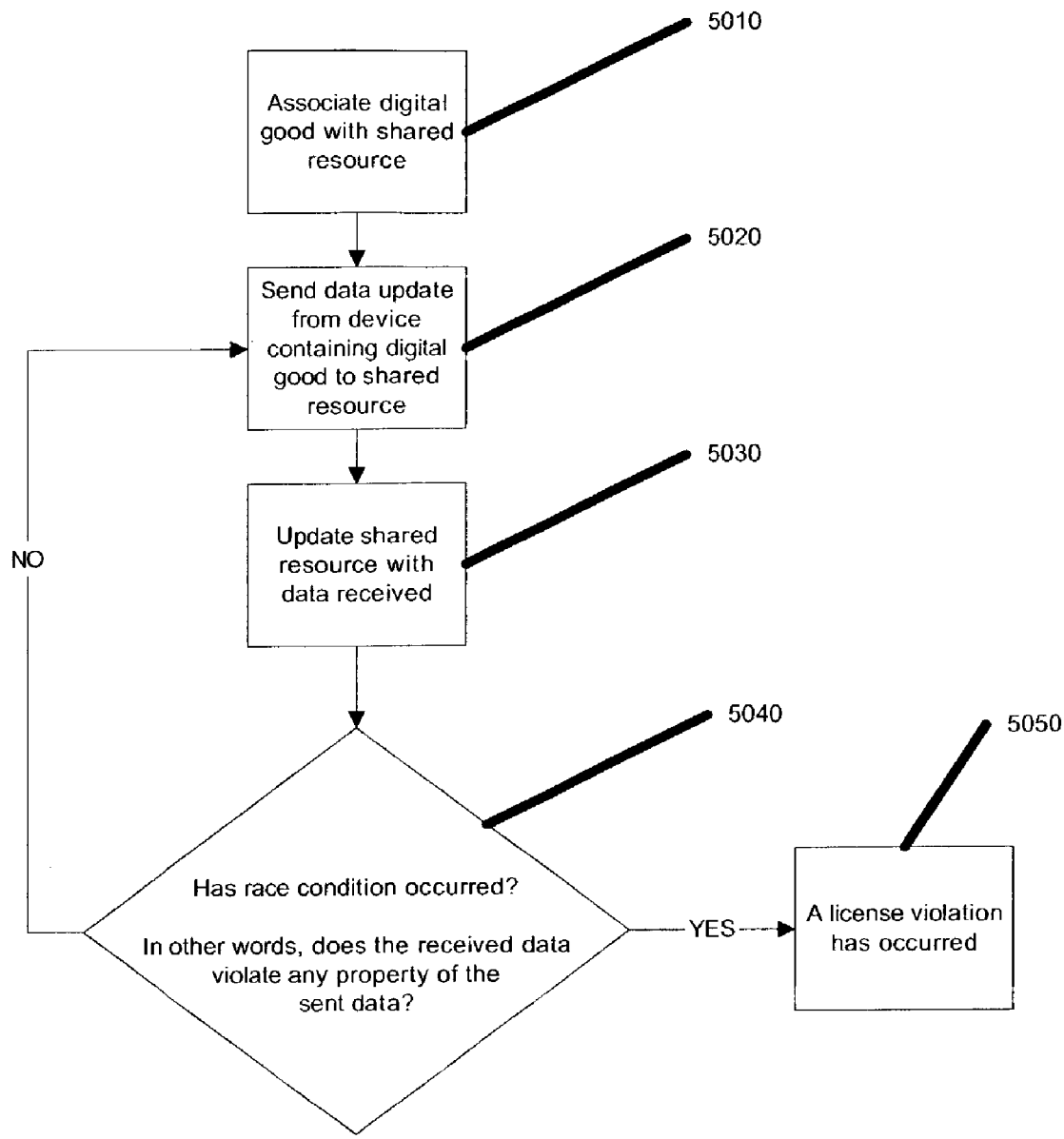
FIG. 2 is a flowchart illustrating a method for monitoring the use of licensed digital goods.

FIGS. 1 and 2 show generally a system and method for monitoring the use of licensed digital goods by detecting race conditions. FIGS. 3-10 and FIGS. 11-17 show specific embodiments of the system and method for monitoring the use of licensed digital goods. These methods makes it possible to detect more than one instance of a licensed digital good such as an installation of software having the same serial number. One example of multiple installations can occur when a software customer installs the purchased software on the customer's own computer using the supplied serial number and passes the software to a friend to install on another computer using the same serial number. This method can be used to prevent software piracy in the mass-market as well as to enable ecommerce.

Instead of disabling pirated installations when multiple installations using the same serial number are found, the original customer can be charged for the additional installations. FIGS. 18, 19, 20 and 21 show an auto-purchase subprocess or method for use by businesses that wish to be automatically charged according to usage. Tracking the usage of licensed goods and having them automatically purchased according to usage is good for both the vendor to maximize licensing revenues and the customer to avoid invasive audits.

Figure 22:
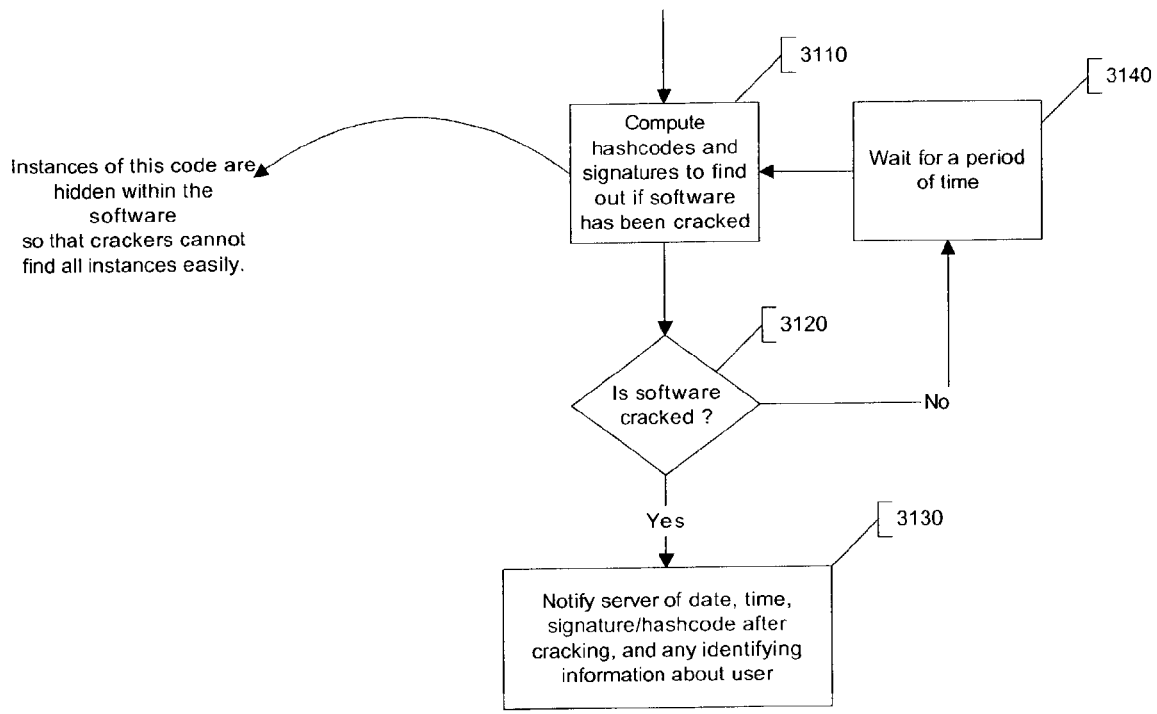
FIG. 22 is a flowchart illustrating a method for monitoring software for cracks or unauthorized modifications.
Figure 23:
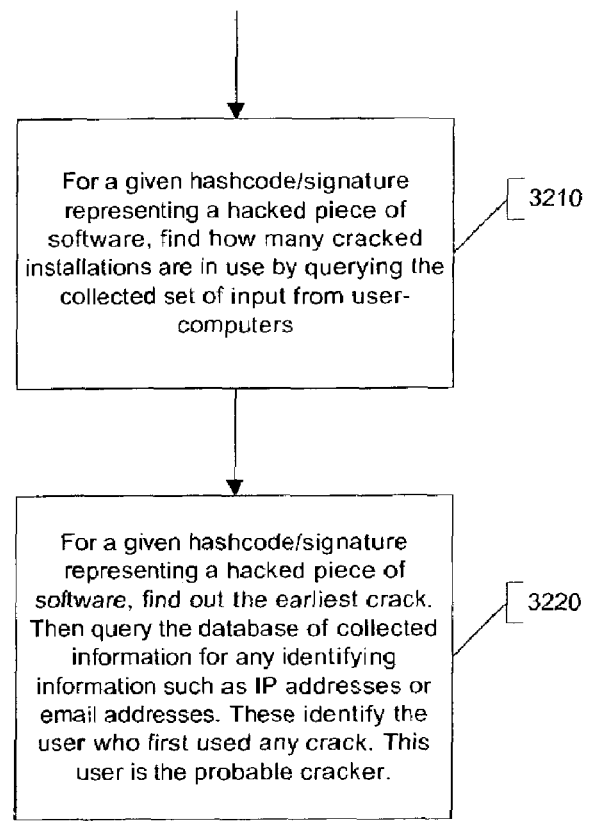
FIG. 23 is a flowchart illustrating a method for detecting cracks or unauthorized modifications.

The software that tracks usage can also be tamper-proof to prevent the customer from changing the software to report inaccurate information to the vendor. FIGS. 22 and 23 show a subprocess or method for making software tamper-proof. Once software tampering has been deterred, all use of digital content (not just software) may be monitored to make sure that it is compliant with the license.

FIGS. 24, 25, 26 and 27 show a method and system for monitoring use of digital content, such as digital music, video, or text. FIG. 28 shows a system for monitoring and protecting the use of web services.

Using these sub-processes together results in a new process for ecommerce in licensed goods that makes it possible for vendors and customers to interact more productively.

Detecting the Use of Multiple Instances of a Licensed Digital Good

To find out if more than one copy or instance of a licensed digital good, such as more than one installation of a software application, is being used with the same license key, a property of software called "race conditions" is used. When two or more independent processes (that are not synchronized with each other) update a shared resource, the result is generally unpredictable. For example, if two unsynchronized threads update the same variable in memory without using any mutex-locks, the variable may end up with an unpredictable value. Race conditions are not limited to shared variables, and they can occur in other situations as well. For example, if two or more processes send a sequence of messages to a single recipient, then the recipient will receive a sequence that is different from the sequence that is sent.

Suppose there is a system called SA that sends messages or data. The messages are received by another system R. Messages are sent and received in an automatic operation. When SA sends a message, it is instantly and reliably received by the message-recipient R. If SA were to send messages following some well-defined rule, then they would be received by R and can be expected to follow the same rule. If SA sends a sequence of purely-increasing numbers (such as 1, 2, 3, . . . ), then R will receive a sequence of purely-increasing numbers. If SA were to send messages so that the time interval between any two messages was at least 10 seconds, then R would receive messages that are spaced at least 10 seconds apart.

Now consider what happens if another system SB were to send messages to R at the same time that SA is sending messages. If neither SA nor SB consults with the other about the messages to be sent and if they both followed some well-defined rule, then it is possible that messages received at R would not follow the same rule. For example, if both SA and SB sent a "purely-increasing" sequence that looked like 1, 2, 3, . . . then R may receive 1, 1, 2, 2, 3, 3, . . . or it might also receive an interleaved sequence like 1, 2, 3, 1, 4, 2, 3, . . . , which violates the "purely-increasing" rule. Similarly if both SA and SB sent messages to R that were spaced at least 10 seconds apart, then R may receive messages that are not spaced 10 seconds apart. This situation when R receives messages that do not follow the rule used to send the messages is called a race condition.

Referring to FIGS. 1 and 2, the system and method for monitoring the use of licensed digital goods using race conditions are described in general. A licensed digital good (e.g., software running on a digital device 740, 750) is associated with a shared resource (e.g., a record in a database 710), step 5010. Each licensed digital good having a serial number, license key or other unique identifier is associated with a different shared resource. Each instance of the licensed digital good (e.g., each installation of software) will thus be associated with and communicate with the associated shared resource, step 5020. For example, software running on digital devices 740, 750 communicates over the internet or other communication medium 730 with a license server 720 connected to the database 710.

When each instance of the licensed digital good is used, the associated shared resource is updated with data, step 5030. The server 720 stores information about the data or messages it receives in the database 710, which can be indexed, for example, by the serial-number, license-key or other identifier of the software sending the message. This arrangement simulates having independent recipient systems for each serial-number or license-key. The software running on the end-user devices 740, 750 are the message sending systems, also referred to as the license client. The license-server 720 together with the database 710 act as the recipient system for all serial-numbers/license-keys.

The license server 720 detects if a race condition has occurred, step 5040, by determining if the received data violates a property or rule of the sent data. The occurrence of a race condition indicates use of multiple instances of the licensed digital good having the same serial number or license key. Based upon the licenses purchased for the digital good, the license server 720 may determine that a license violation has occurred.

Figure 3:
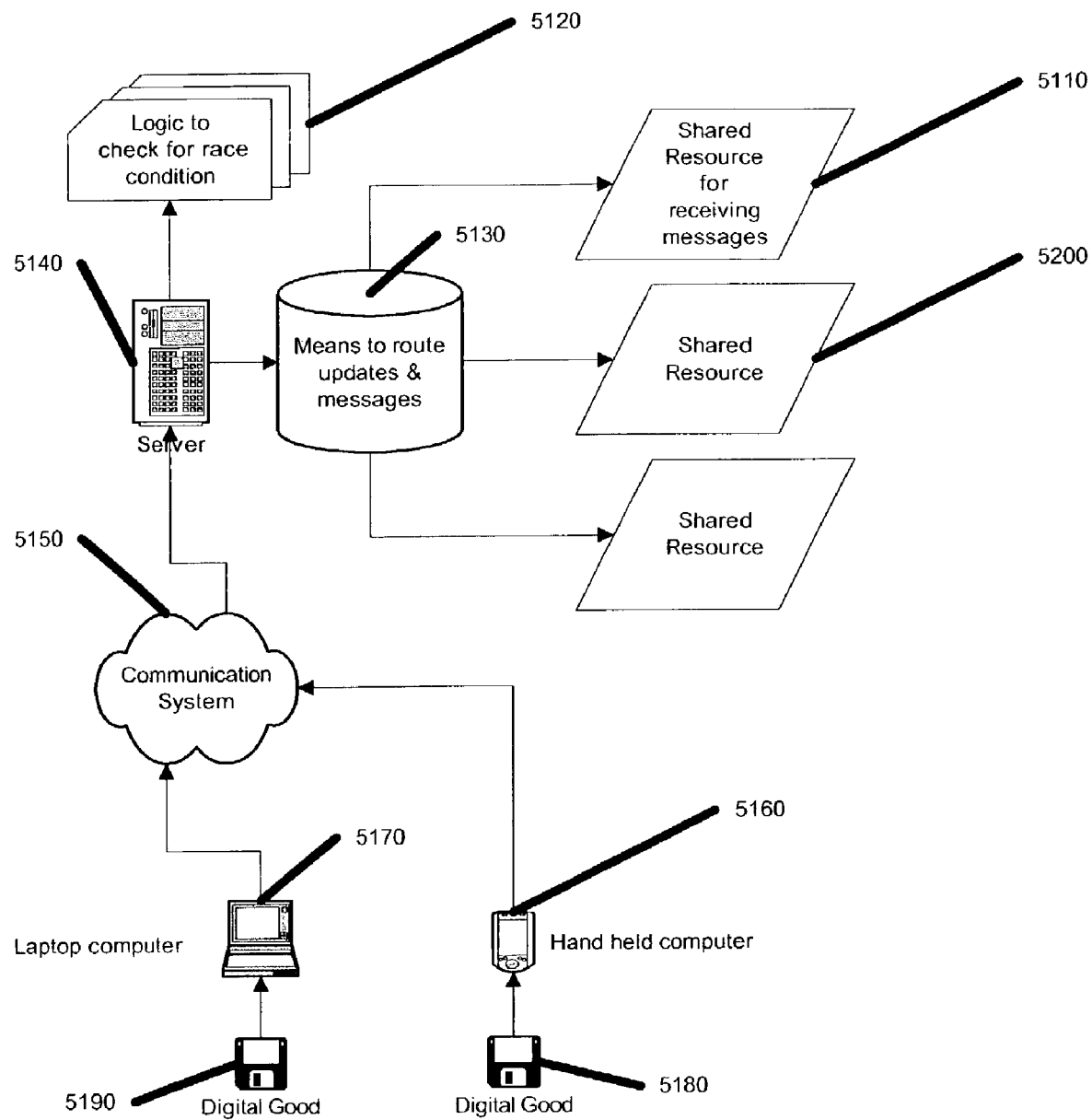
FIG. 3 is a schematic diagram of one embodiment of the system for monitoring licensed digital goods.

Referring to FIG. 3, one embodiment of the system for monitoring licensed digital goods, such as software, is described in greater detail. A set of message-recipients or shared resources 5110, 5200 is created, one for each license key of a digital good 5180, 5190. For example, the digital good 5190 may be associated with the shared resource 5110 and the digital good 5180 with shared resource 5200. Software applications or devices 5160, 5170 that process digital goods 5190, 5180 are written so that they communicate with these message recipients 5110, 5200 over the internet or other communication system 5150. For example, the device identifies the recipient (or shared resource) to communicate with based upon the license key of the digital good. If two software applications have the same license key, then they communicate with the same message recipient. Digital goods with different license keys access different recipients or shared resources.

The license server includes software or other logic 5130 to route the communication from the sending devices 5170, 5160 so that it reaches the appropriate recipient 5110, 5200. The license server also includes software or other logic 5120 that checks for race conditions. The recipients 5110, 5200 and the message handling logic 5130, 5120 are preferably part of a license server 5140. In one preferred embodiment, a single web-server connected to a database can be used to simulate a multitude of independent recipient systems. This solution facilitates the creation and maintenance of thousands of different recipient systems.

Referring to FIGS. 4-10, one embodiment of the method for monitoring licensed digital goods detects race conditions based on the timing of data received. The data or messages are sent to the license server based on the rule "Consecutive messages are at least X seconds apart." The process involves waiting at least X seconds (possibly a random number of seconds more), step 110, sending a message or data to the license server, step 120, and receiving a response if the data is not received according to the expected timing, step 130. The process is repeated such that the data is sent periodically by each instance of the licensed digital good. If the server reports a license violation based on the determination that more than one instance of a licensed digital good is sending data to a shared resource, then it is reported to the user or other appropriate action taken, step 140. In the exemplary embodiment, all messages sent by a license client to the license server include the serial-number or license-key of the sending system.

Figure 4:
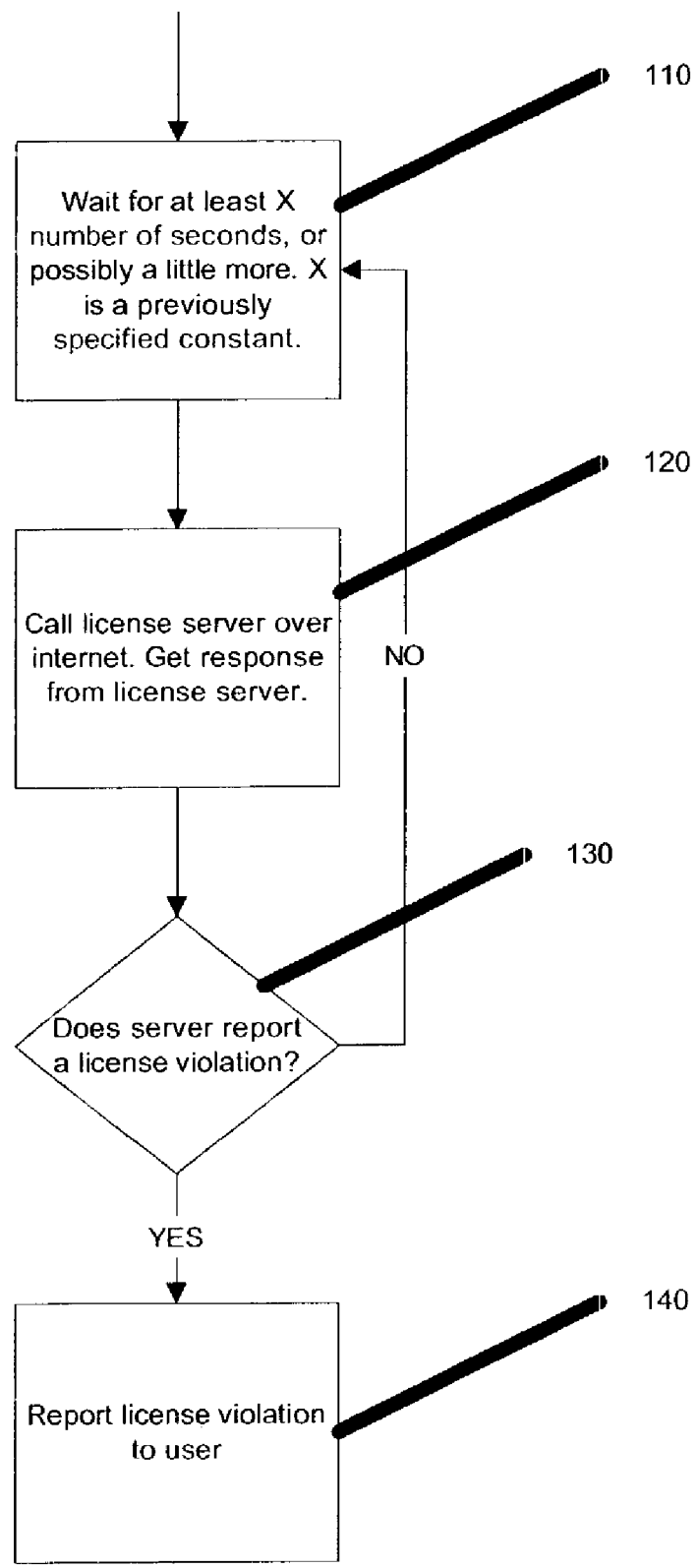
FIG. 4 is a flowchart illustrating one method for updating a shared resource by periodically sending messages for use in monitoring licensed digital goods.
Figure 5:
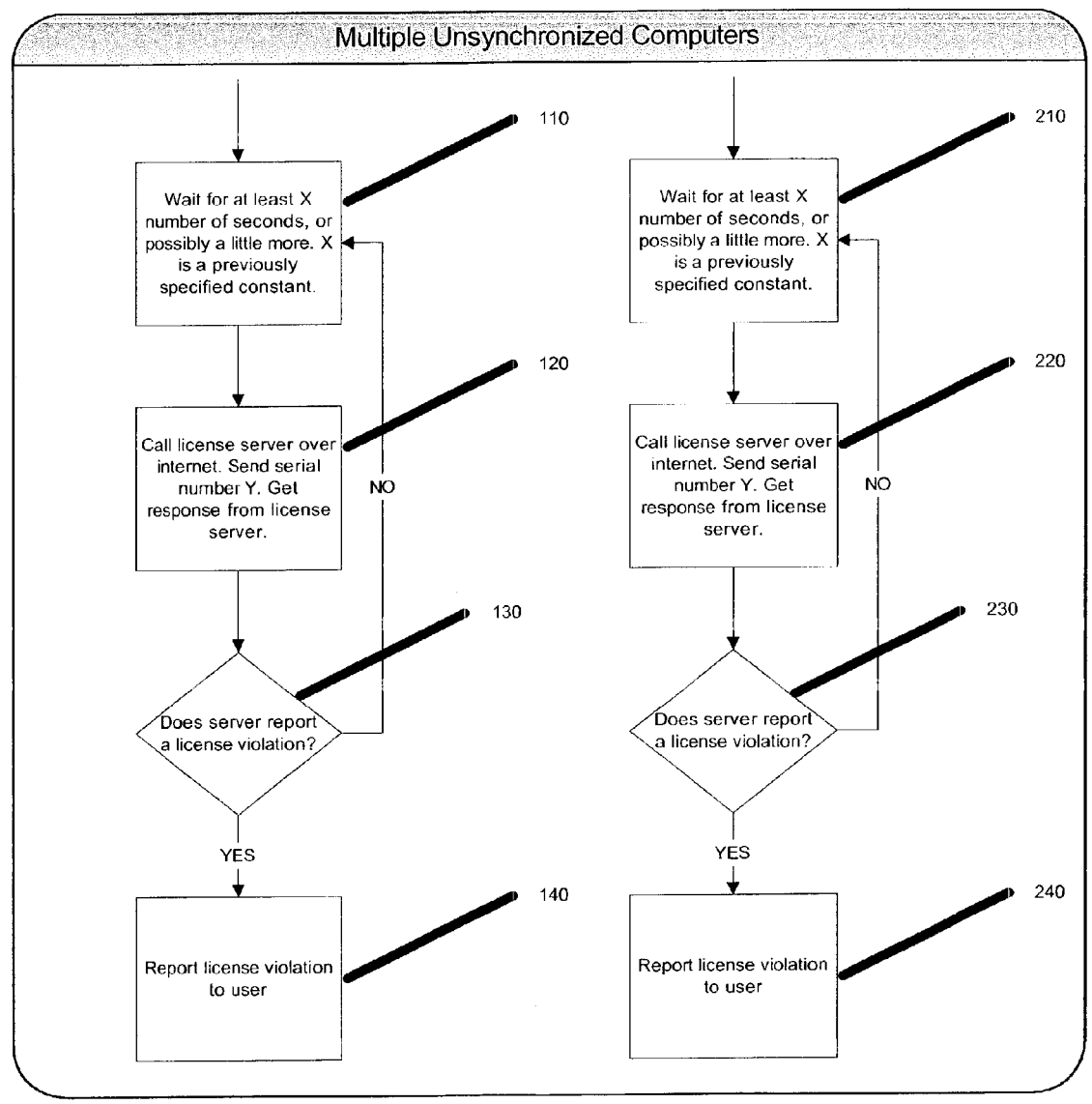
FIG. 5 is a flowchart illustrating multiple instances of a licensed digital good having the same serial number or license key updating a shared resource according to the method of FIG. 4.

FIG. 5 shows multiple unsynchronized clients simultaneously sending data according the method of FIG. 4. In this example, two sending systems are operating with the same license-key or serial-number and with the time-delay X (e.g., a value of 10). Steps 110, 120, and 130 may overlap with steps 210, 220 and 230 because the two sending systems are not synchronized with each other.

Figure 6:
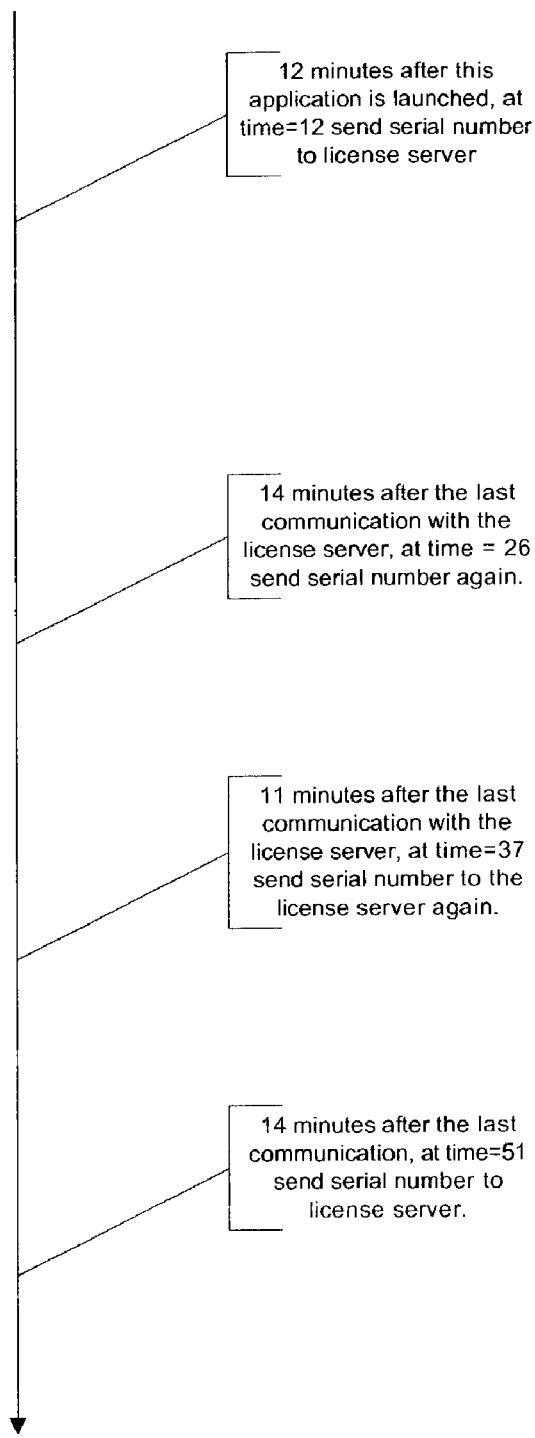
FIG. 6 is a timeline illustrating one example of communications sent by a single instance of a licensed digital good using the method of FIG. 4.

FIG. 6 shows a timeline for one sending system or client using the process shown in FIG. 4 where X=10. FIG. 7 shows the data or messages sent to the license server in an overlapped manner as a result of the overlap in the steps followed by the two sending systems shown in FIG. 5.

Figure 8:
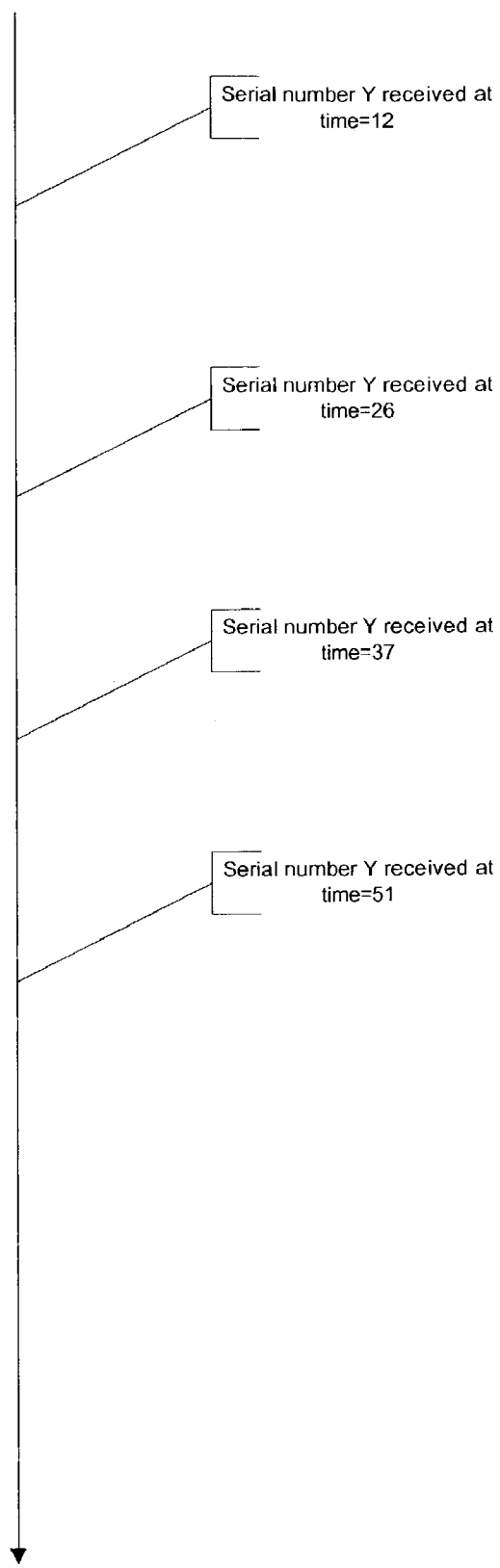
FIG. 8 is a timeline illustrating communications received by a shared resource based on the communications sent by a single instance as shown in FIG. 6.
Figure 9:
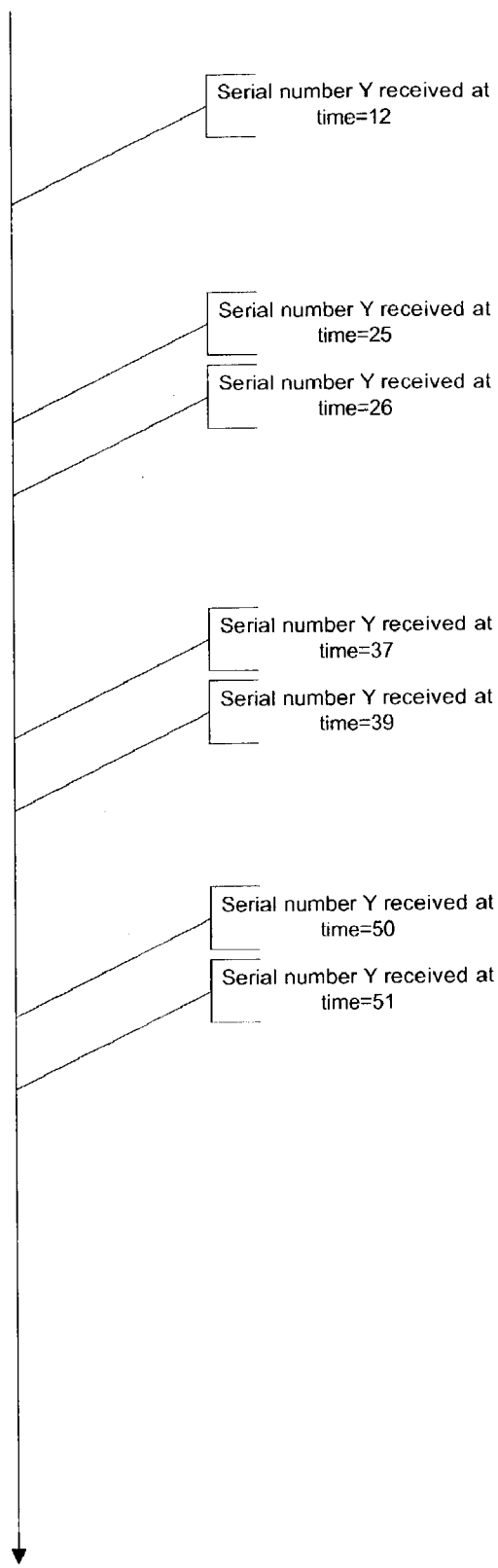
FIG. 9 is a timeline illustrating communications received by a shared resource based on the communications sent by two instances as shown in FIG. 7.

FIG. 8 shows the sequence of messages received by the license-server with a serial number of Y when only one license client is operating as shown in FIG. 6. Thus, when only one instance of the licensed digital good is being used, the rule "consecutive messages are at least X seconds apart" is experienced by the recipient system. FIG. 9 shows the messages received by the license-server when messages are sent by two license-clients (with the same serial-number Y) as shown in FIG. 7. Thus, when more than one instance of the licensed digital good is being used, the rule "consecutive messages are at least X seconds apart" is not experienced by the message-recipient. Depending upon the number of licenses and the type of license granted, this may be an indication of piracy.

Figure 10:
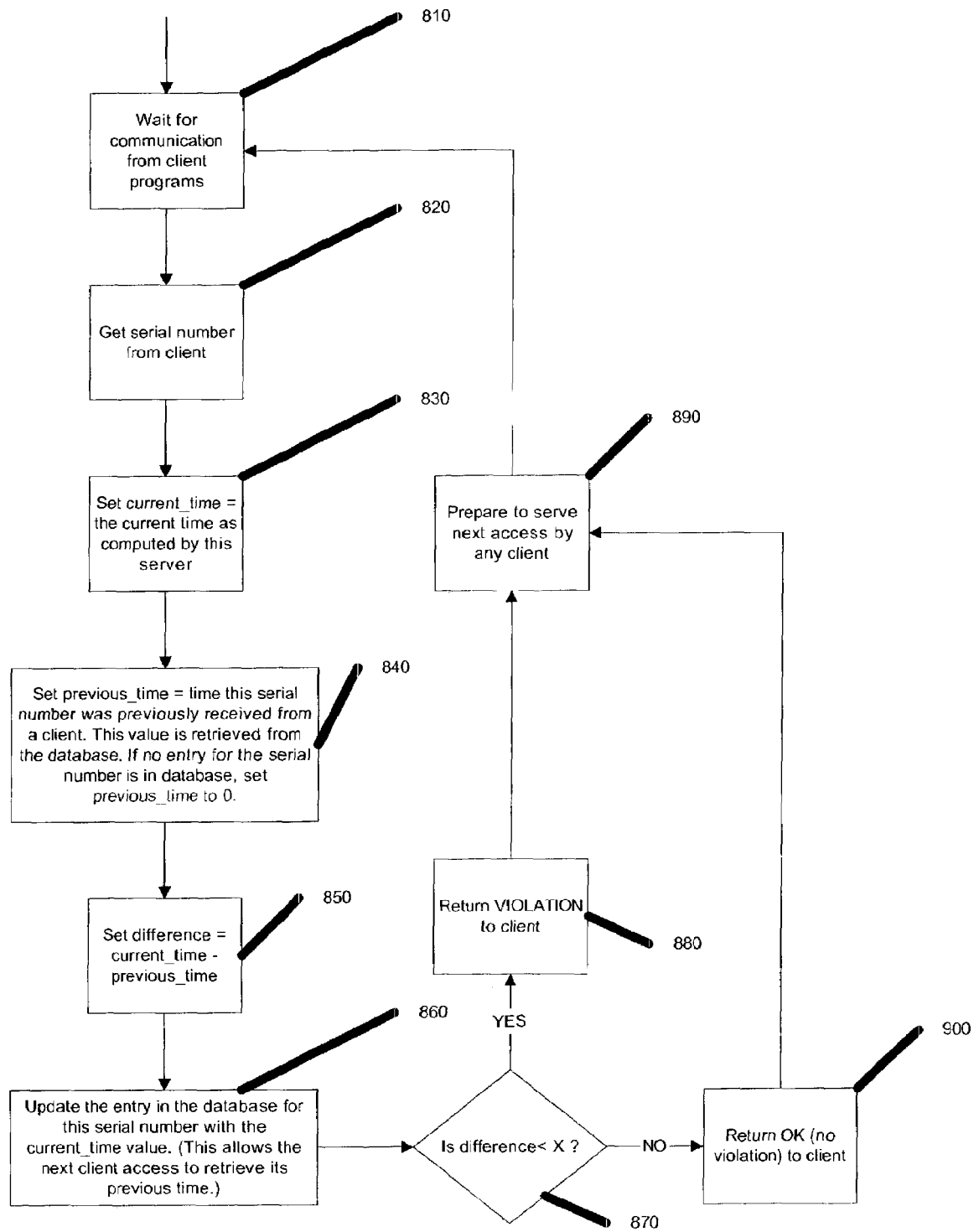
FIG. 10 is a flowchart illustrating one method for monitoring periodic data received by the shared resource to detect use of multiple instances of the licensed digital good.

FIG. 10 shows one method followed by the license-server as it records received messages and determines whether the rule "consecutive messages are at least X seconds apart" has been followed or not. The server waits until a communication is received, step 810. Next the server determines the serial number, step 820, so that it can retrieve information from the database, which is indexed by serial-number. The server then computes the time separation between the last two communications received for this serial number, steps 830, 840 and 850. The server also records information about the most recent message received in the database, step 860, and checks to see if the rule "consecutive messages are at least X seconds apart" has been followed, step 870. The server may then take appropriate action, steps 880, 900, and prepares to receive the next message, step 890. Instead of using a fixed time period X to check for overlap, each communication from the client to the server can explicitly give a time-period and the server can directly check for overlaps.

Figure 11:
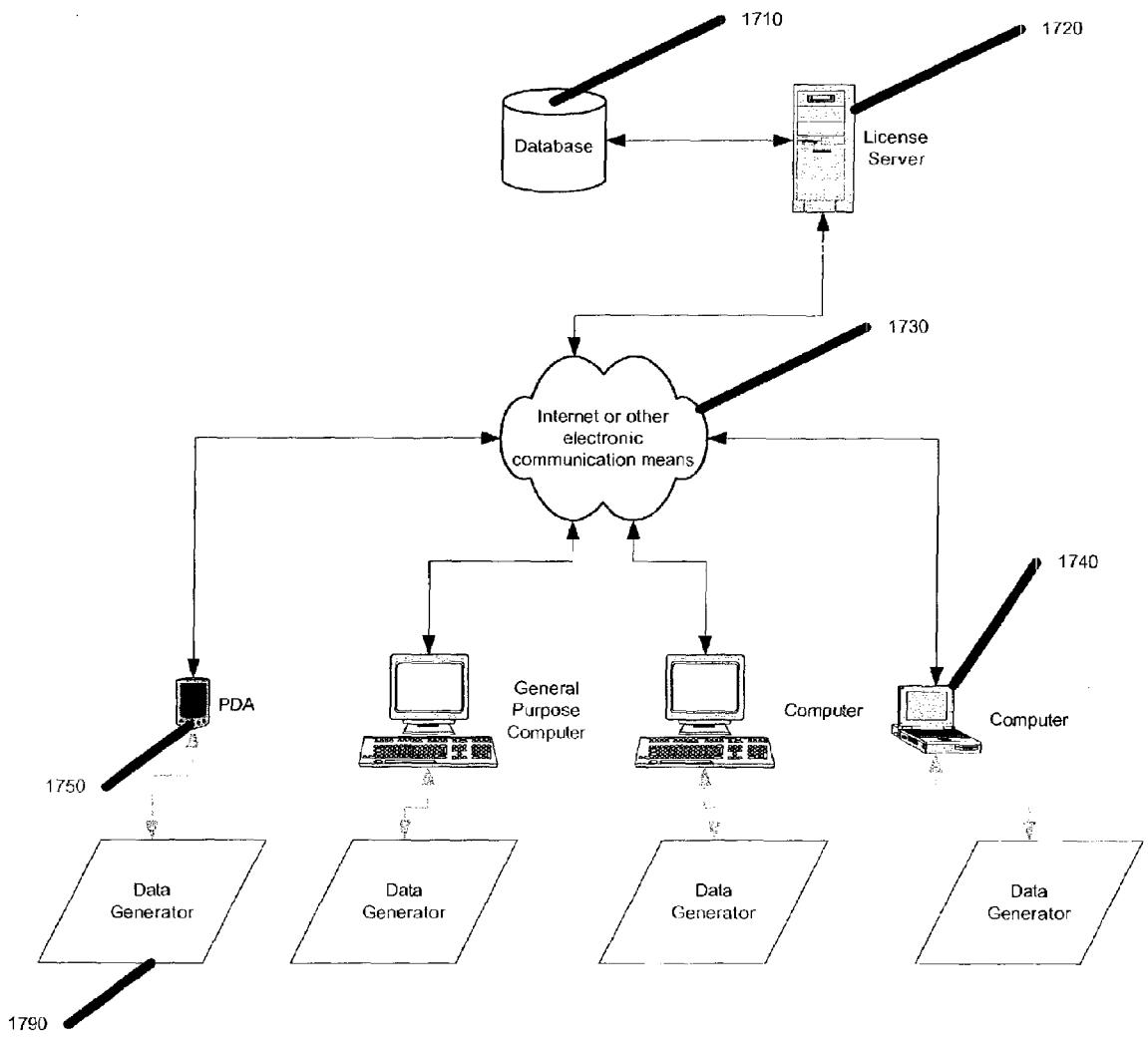
FIG. 11 is a schematic diagram of another embodiment of the system for monitoring licensed digital goods based on a data sequence.

Referring to FIGS. 11-17 an alternative embodiment of a method for monitoring licensed digital goods detects race conditions based on a predefined sequence of data. FIG. 11 shows end-users computers or digital devices 1740, 1750 talking to the central license server 1720 over the internet 1730. The central license server 1720 uses the database 1710 to keep track of the data tokens received when each client computer or device 1740, 1750 communicates with the server 1720. When client computers or devices 1740, 1750 communicate with the license server 1720, they each send the serial number or license key that was used to install the software application or other licensed digital good. In addition, they send a sequence token from a data generator 1790.

Figure 12:
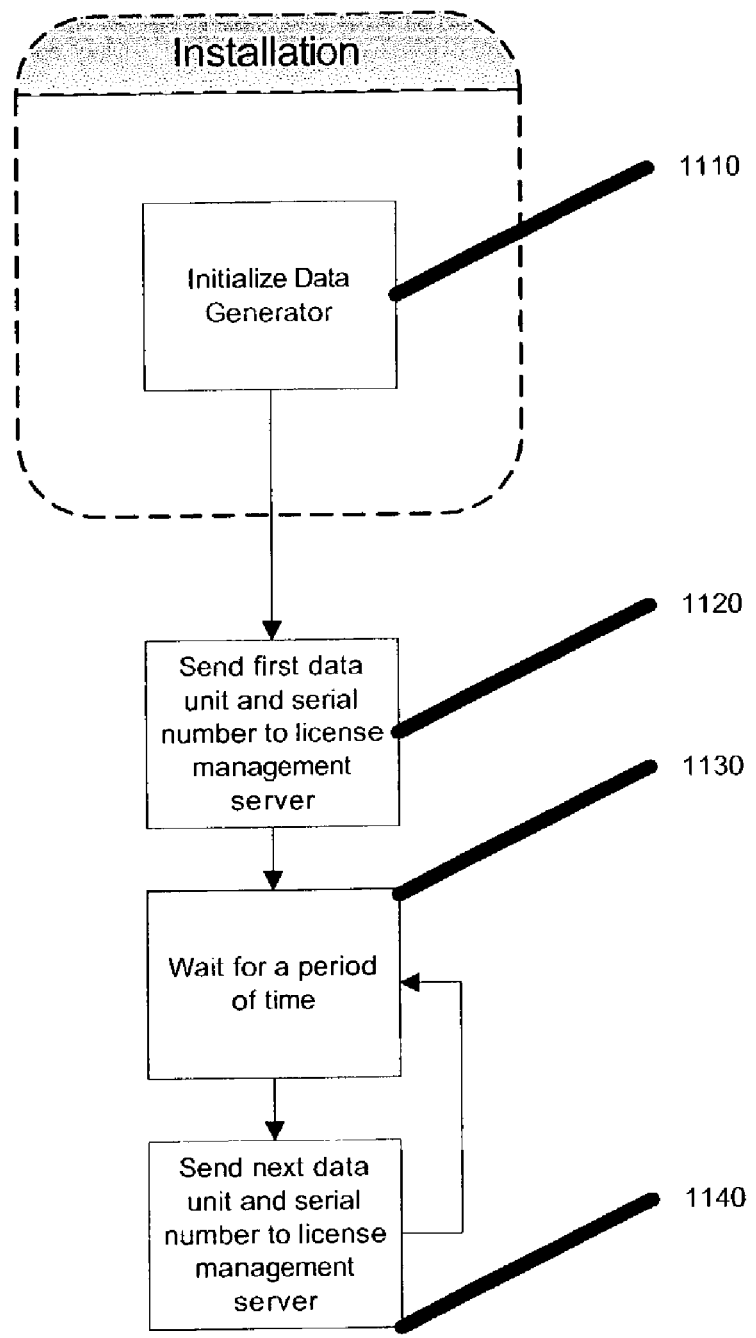
FIG. 12 is a flowchart illustrating one method for updated a shared resource by sending a well-defined sequence of data packets to the server.

FIG. 12 shows the actions of the user's computer or device 1740, 1750. When a software application or other digital good is installed, the data generator 1790 is initialized, step 1110. Once initialized, the data generator produces a sequence of tokens based on an algorithm known by the license server 1720. The sequence token generated is sent along with the serial number or license key to the license server, step 1120. Next, the user's computer or device waits for a period of time (possibly months), step 1130. After the wait period is over, the computer or device sends the next token in the sequence along with the serial number to the license server, step 1140.

Figure 13:
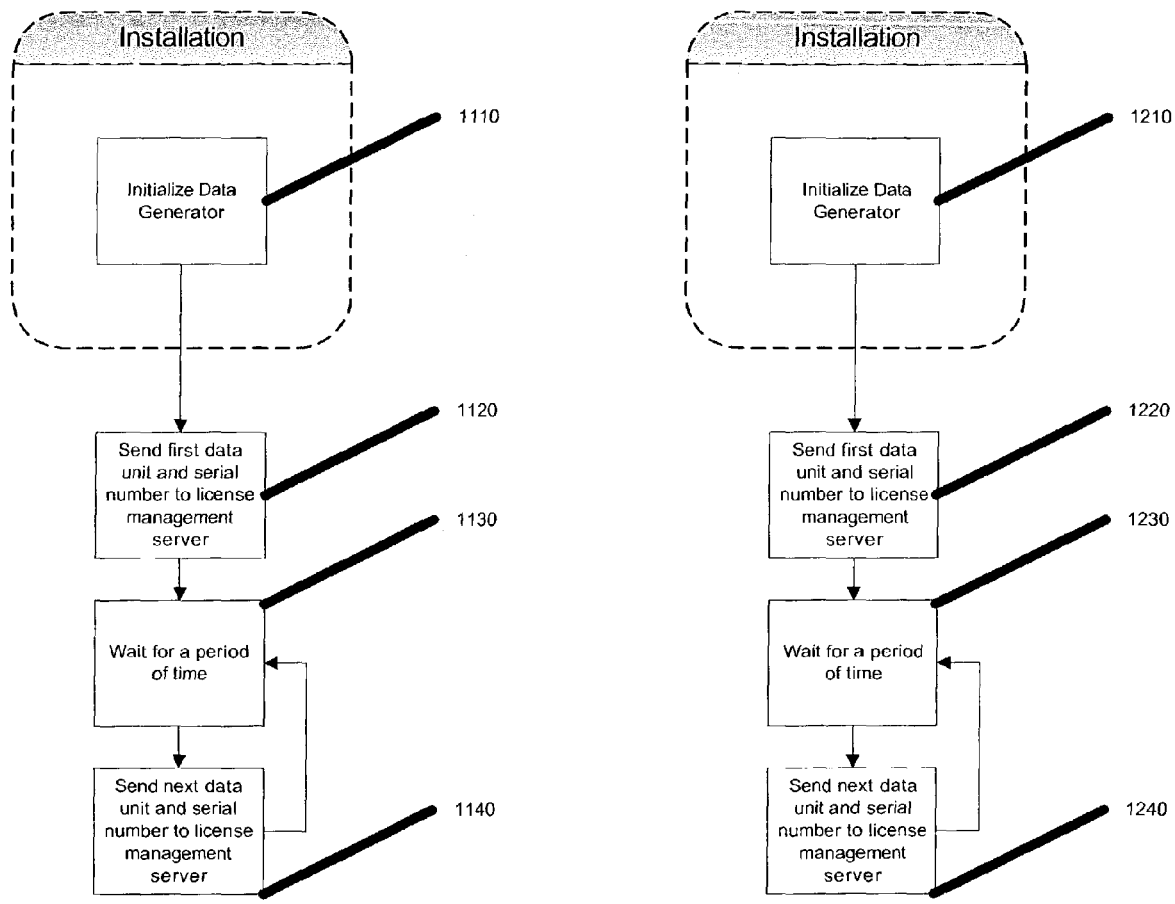
FIG. 13 is a flowchart illustrating multiple instances of a licensed digital good with the same serial number or license key updating a shared resource according to the method of FIG. 12.

FIG. 13. shows two user computers having an application installed with the same serial number communicating with the license server according the process of FIG. 12. Just as the first computer sends a sequence of data to the license server, steps 1110, 1120, 1130 and 1140, the second computer also sends the same sequence of data to the license server, steps 1210, 1220, 1230, and 1240.

Figure 14:
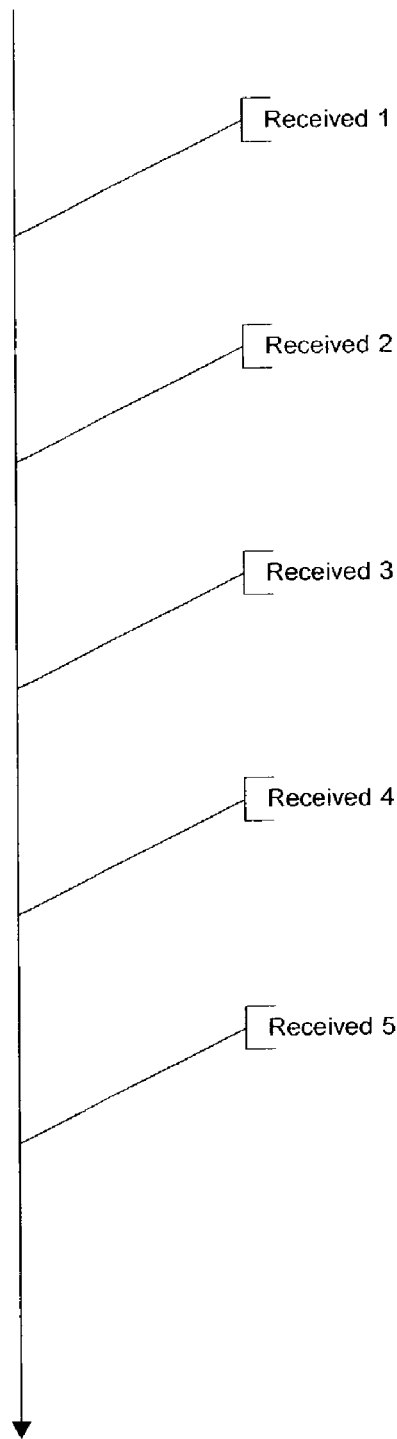
FIG. 14 is a timeline illustrating one example of sequenced data packet communications sent by a single license client using the method of FIG. 12.
Figure 15:
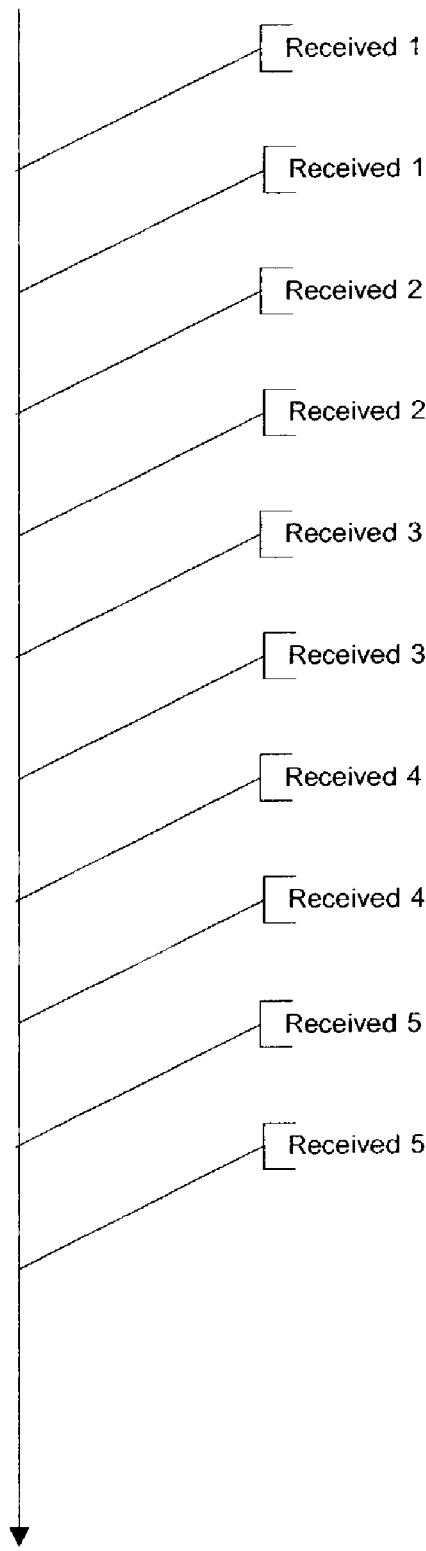
FIG. 15 is a timeline illustrating one example of sequenced data packet communications sent by multiple instances of a licensed digital good using the method of FIG. 13.
Figure 16:
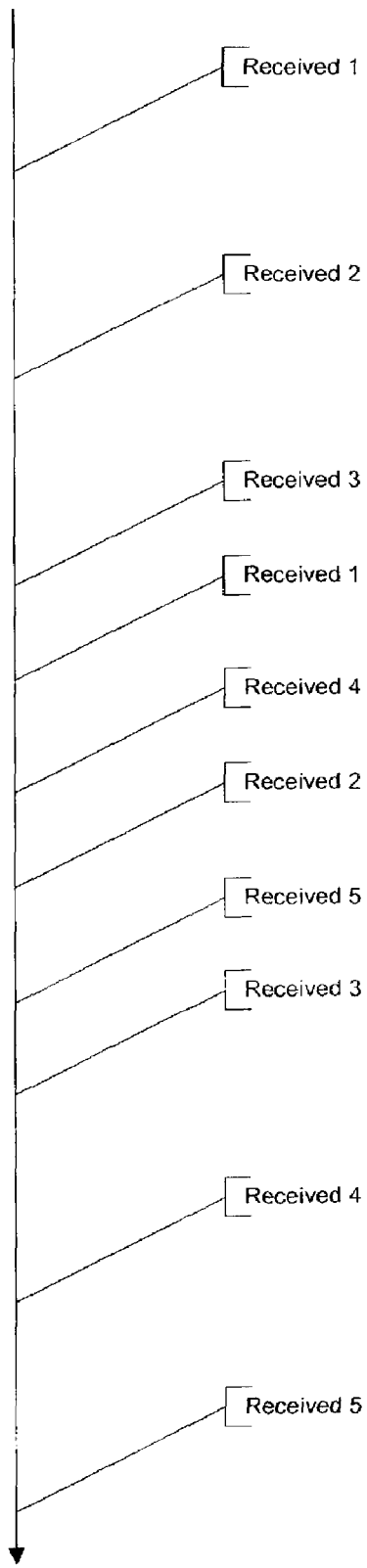
FIG. 16 is a time line illustrating communications received by a shared resource based on the communications sent by a single instance as shown in FIG. 12.

One exemplary implementation of the data sequence generator is a system to generate the numbers 1, 2, 3, 4, 5, . . . in order. The rule that is followed by the message-sender system is "a sequence of increasing numbers." FIG. 14 shows the sequence received by the license server for any specific serial number when exactly one computer has an application installed with that serial number. When the license server receives 1, 2, 3, 4, . . . in that order, the license server determines that the expected sequence is received because the sequence received satisfies the rule "a sequence of increasing numbers." FIG. 15 shows the sequence of numbers received by the license server (for that serial number) when two applications are installed on both computers at approximately the same time. FIG. 16 shows the sequence of numbers received by the license server (for that serial number) when the applications are installed on the two computers at different times. In both cases, the sequence received by the license server is not the expected sequence because the sequence received does not satisfy the rule "a sequence of increasing numbers." The license server expects the numbers 1,2,3,4 . . . in strict sequence. Therefore, the license server can detect a race condition, and thus the use of multiple instances of a licensed digital good having the same serial number or license key, by watching for garbled sequences.

Figure 17:
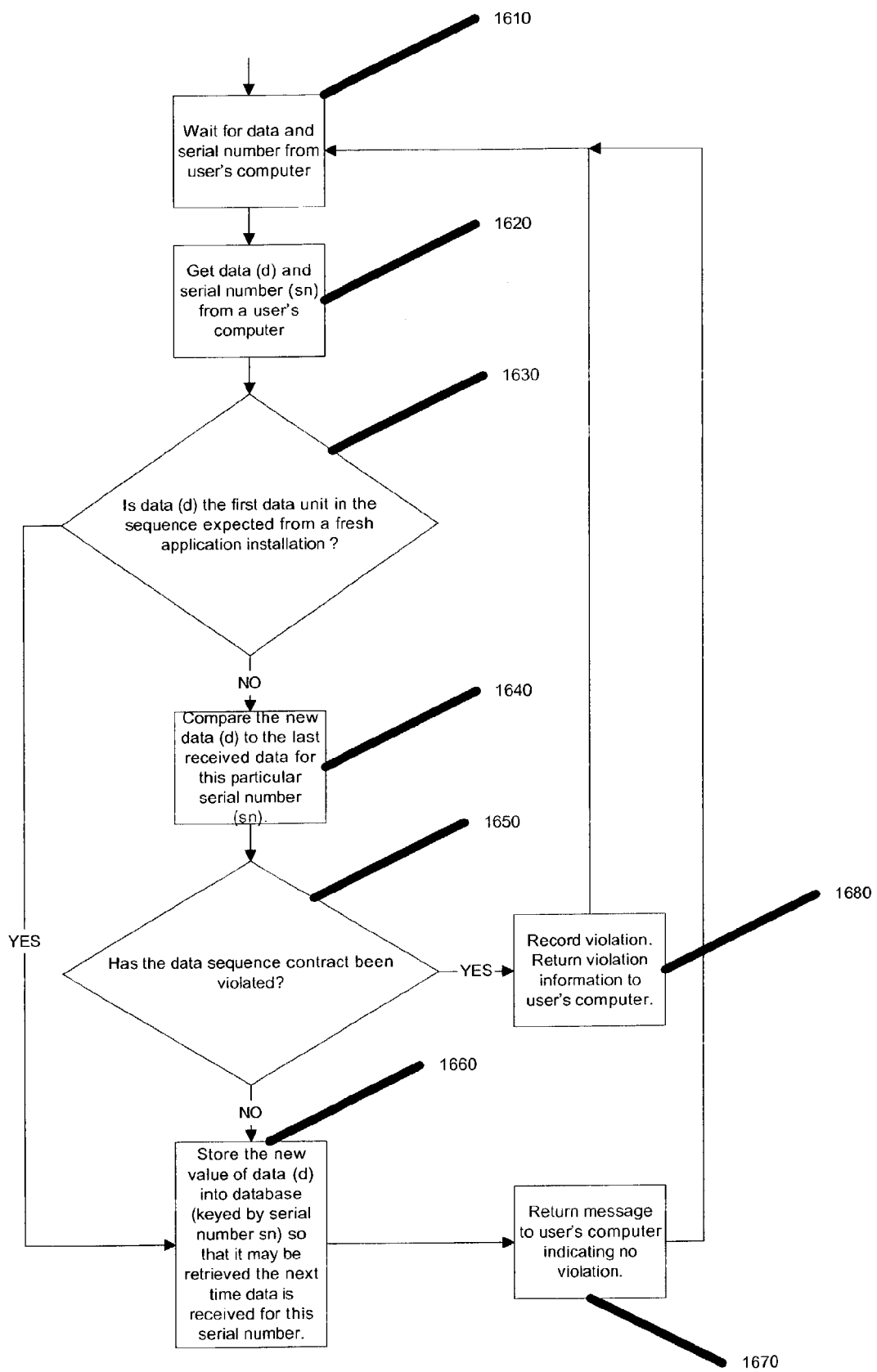
FIG. 17 is a flowchart illustrating communications received by a shared resource based on the communications sent by a multiple instances as shown in FIG. 13.

FIG. 17 shows one method by which the license server detects a garbled sequence. The license server waits for incoming network connections, step 1610. When a network request has been received, it parses the request to determine the serial number and the sequence data, step 1620. Since the sequence break that occurs when an application is reinstalled or transferred from one computer to another is legitimate, the sequence data is first checked to see if it is the first in the sequence (e.g., the data value 1), step 1630. If it is the first number in the sequence, further checks are skipped, the sequence number is stored in the database, step 1660, and a result of "no violation" is returned to the user's computer, step 1670.

If the sequence data is not the first data token in the sequence, the last token that was received for this same serial number is retrieved from a database and compared with the new token, step 1640. The license server determines if the sequence of the received data complies with the predefined rule, step 1650. According to the exemplary numerical sequence (e.g., 1, 2, 3, . . . ), if the license server determines that new token=old token+1 then the data sequence is in order. If the sequence complies with the rule, the license server does not detect an additional installation and license violation, step 1680. If the received sequence does not comply, a violation may be reported to the user if the user is not licensed for the additional installation, step 1680.

Instead of using a sequence of 1,2,3 . . . . any sequence of data tokens may be used as long as a simple test of whether received data tokens are in sequence or not can be performed by the license server. Instead of using a sequence of data tokens, any information may periodically be sent to the license server, as long as the license server can detect a property of the received information that indicates that there are two or more separate computers sending the information.

In the exemplary embodiment described above with respect to FIGS. 3-17, the license server is multi-threaded and database accesses are performed in transactions. The license server may be implemented using http, SOAP, RMI, RPC, or other similar communication protocols. It can be written in Java, C++ or VBScript. Instead of using a database, other data storage mechanisms may be used. Also, other known race condition protocols may be used.

For scalability, the license server may be partitioned. For example, the client can compute an 8-bit hash code of the serial number using a predefined hash-algorithm. Using this hash code, the client can choose one of 256 different license servers to communicate with. Because the hash algorithm is predefined, two clients with the same serial number will choose the same license server. By partitioning license servers based on a hash-code of the serial number, and by choosing the hashing algorithm appropriately, this method can be scaled to millions of users.

Counting the Number of Instances of a Licensed Digital Good in Use

Figure 18:
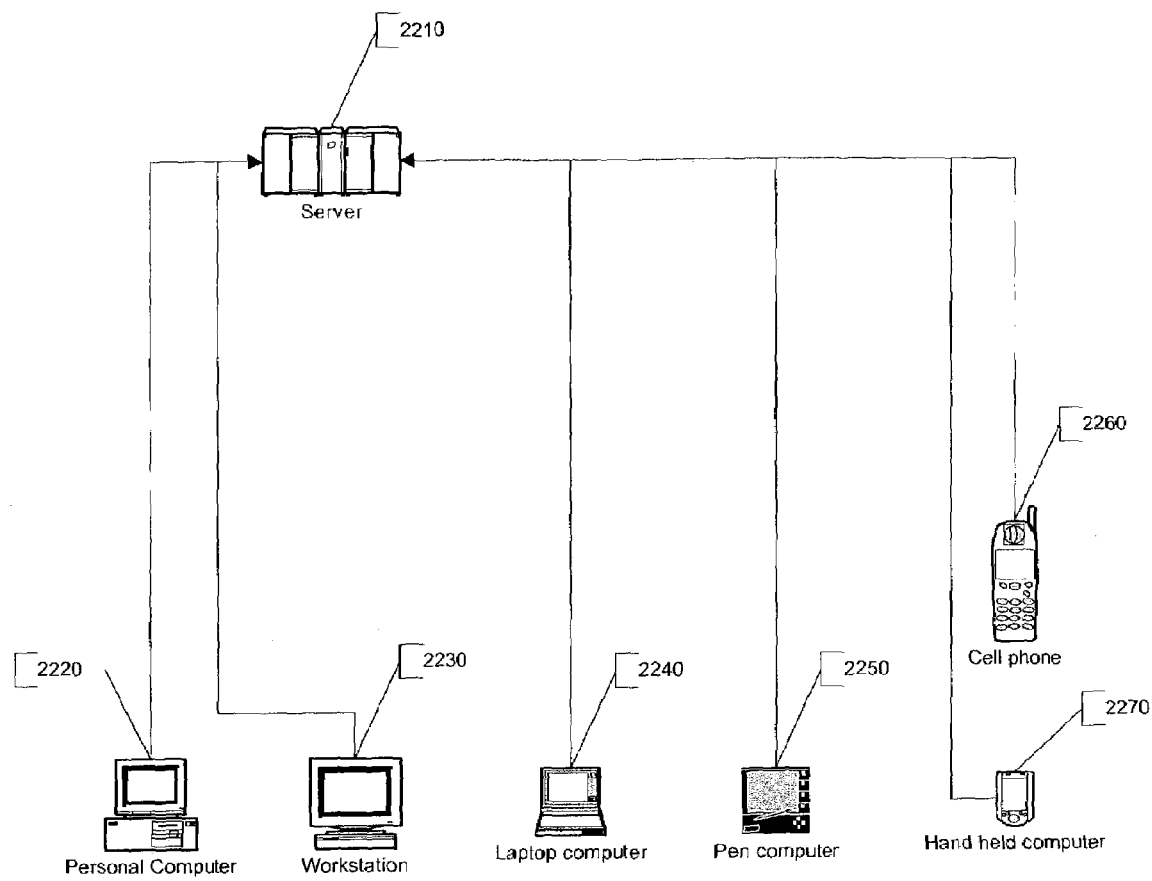
FIG. 18 is a schematic diagram of a system for monitoring licensed digital goods by counting a number of instances of the licensed digital good having any specific license key.

Referring to FIGS. 18-21, a system and method of monitoring the use of licensed digital goods determines the number of instances in use for a particular licensed digital good. FIG. 18 shows client software on a number of different computers or digital devices 2220, 2230, 2240, 2250, 2260, and 2270 communicating with a server 2210.

Figure 19:
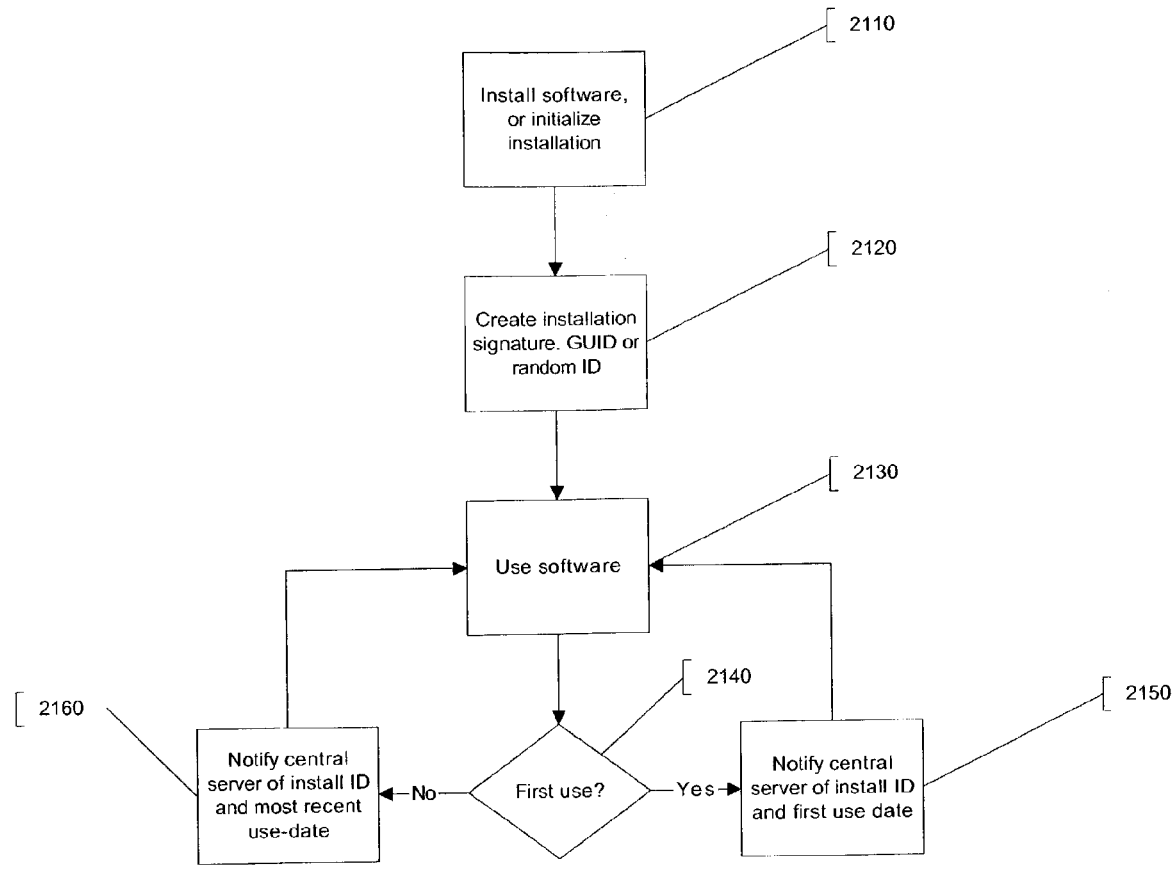
FIG. 19 is a flowchart illustrating a method for updating a shared resource by sending time of use information for each instance of a licensed digital good.

The steps followed by the client software are shown in FIG. 19. The client software having a serial number or license key is installed by users, step 2110. The software creates a globally unique identifier (GUID) to identify the installation instance, step 2120. Each time the software having a particular serial number is installed, for example, a different GUID created for that instance. Instead of a GUID, a random number may be used as long as the probability that two installations will get the same random number is very low.

When a user runs each instance of the software, step 2130, it communicates with the server 2210. If the software is being run in that installation for the first time, step 2140, it notifies the server of the time (and date) the software was first run, step 2150. The server 2210 records this time and date. On subsequent runs of each instance of the software, it communicates the time and date of the most recent run to the server, step 2160. The server 2210 records the most recent time and date each software installation was used.

Figure 20:
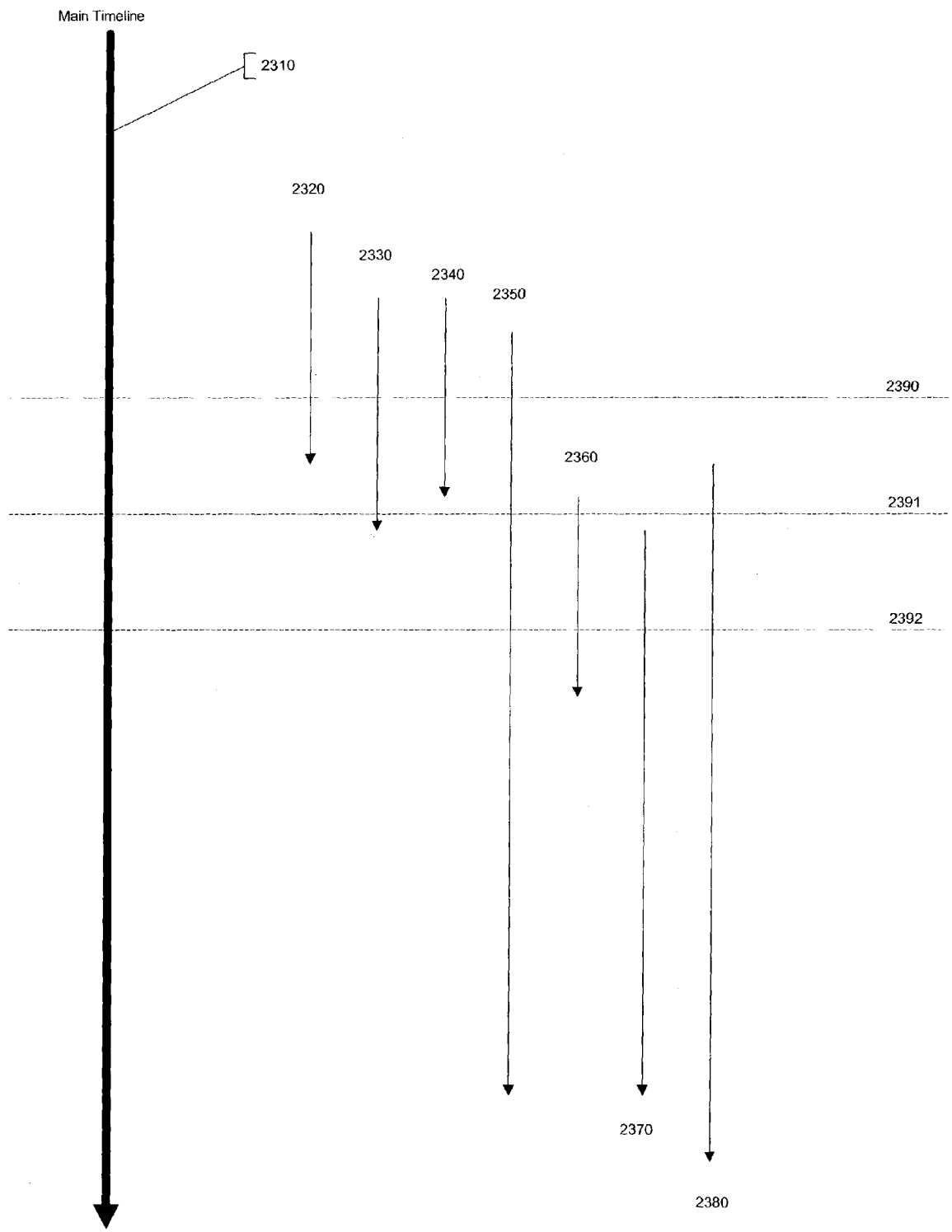
FIG. 20 is a timeline illustrating a timeline of the use of multiple instances of a licensed digital good.

FIG. 20 shows the information that the server 2210 records for all the instances or installations. It keeps track of the date/time each installation of the software was first run as well as the most recent date/time it was run. From this information, it can generate a timeline map 2310 showing when each installation of software 2320, 2330, 2340, 2350, 2360, 2370, and 2380 was first run and when it was most recently run. In FIG. 20, the beginning of each line corresponds to the first run and the end of the arrow denotes the timestamp of the most recent run. The timelines show that installation 2320 was the first installation to be used, then installations 2340 and 2330 and so on. It also shows that installation 2320 has not been used for a while. In addition, installation 2360 was first used after installation 2320 became dormant suggesting that a user may have uninstalled instance 2320 and then installed instance 2360 possibly on a different computer.

Each horizontal line in FIG. 20 represents a single instant in time. The horizontal line 2390 intersects with four installation timelines 2320, 2330, 2340 and 2350. This means that during the instant of time represented by the line 2390, four installations 2320, 2330, 2340, 2350 were in use. Similarly during the instant of time represented by the line 2391, a different four installations 2330, 2350, 2360 and 2380 were in use.

It is possible that one of the installations that appears to be dormant when these measurements are taken will become active. Thus, there are at least as many installations active as the number of installations counted at an instant of time, but there may be more. For example, if at a much later time, a user were to run the installation 2340, then the arrow would extend down further in time. In other words, at time instant 2390, at least four installations were active but there may be more that are counted when the information changes in the future.

Figure 21:
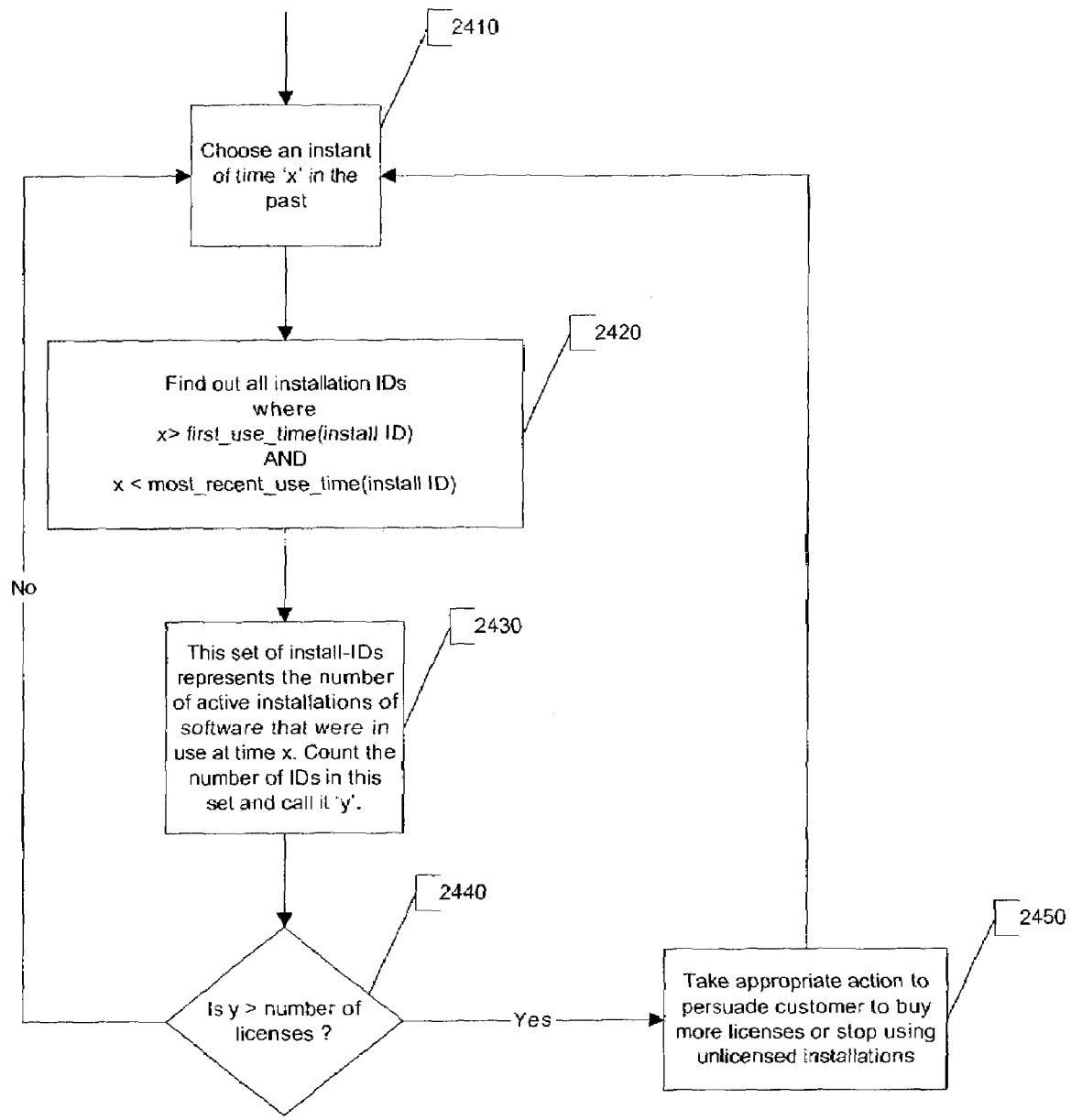
FIG. 21 is a flowchart illustrating a method for counting the number of instances of the licensed digital good that are being used with the same license key.

FIG. 21 shows the steps to be followed by the server to compute at least how many installations were active at a time in the past. For a chosen instant of time in the past, 'x', step 2410 (such as represented by the horizontal line 2390), the server determines all installations which are known to be active, step 2420. If 'x' is represented by the line 2390, then the known active installations 2320, 2330, 2340 and 2350 are counted, step 2430. The number of active installations should be less than or equal to the number of licenses, step 2440. If not, additional licenses can be automatically sold to the user-organization or the user can be asked to stop using the unlicensed installations, step 2450. Thus, this sub-process helps count how many installations are active and take appropriate action.

Detecting Software Tampering

Referring to FIGS. 22 and 23, one method of monitoring licensed digital goods also detects software tampering. Multiple instances of code whose only purpose is to detect tampering can be embedded in the licensed digital good, such as software. These instances of code preferably do not share functions.

The steps followed by these instances of code are shown in FIG. 22. First the code computes a hashcode or signature (or checksum) on the software, step 3110. If it detects that the software is different from what it expected, step 3120, it notifies the server 2210 of the software signature, date and time the crack was detected, and any identifying information about the user, step 3130. If the code does not detect any cracks, it simply waits and checks again later, step 3140.

The server 2210 collects information about cracks from many different computers. FIG. 23 shows the steps taken when the vendor wants to find out who created a particular crack. First, the server determines how many cracked instances of the software are in use, step 3210. The server then determines the first time that particular crack was detected in step 3220. Any identifying information associated with the first time the crack was detected will usually point to the person who created the crack.

When multiple instances of crack-detecting code are embedded in software, a cracker cannot easily find them all and disable them. So the cracker's changes will be detected by the remaining detection code and reported. The crack is reported along with a timestamp. The earliest timestamp for the first time the crack was detected will usually be the original cracker. The software vendor may then take appropriate action against the cracker to deter cracks in the future.

Detecting the Use of Multiple Instances of Licensed Digital Goods other than Software The sub-processes in the exemplary embodiment described above specifically refer to software. The sub-processes described above can also be applied to ecommerce of other intangible digital goods including, but not limited to, e-books and music.

If a customer, for example, wants to create a collection of e-books, the customer first uses a GUID generator to generate a unique license key. The GUID generator creates long identifiers that are likely, if not guaranteed, to be unique such that other users will not be given the same GUID/license-key. The customer buys the latest best-seller by entering the private GUID or license key and downloading the e-book from an ecommerce site. The ecommerce vendor encrypts the e-book using the key provided by the customer and delivers the encrypted e-book to the customer's personal computer.

After the customer has installed the e-book reader on the personal computer and has entered the private license key into the e-book reader, the e-book reader decrypts the book using the license key and displays the text. If the customer later upgrades the computer, the e-books can be copied to the new computer and deleted from the old computer. The customer can then install an e-book reader on the new computer, enter the private license key, and read the e-books without facing any licensing issues. Thus, customers are able to move the e-books from computer to computer. However, the customer is prevented from making copies and illegally distributing the e-book or other digital good because every customer is given one or more personal license keys by a GUID generator and no two customers are given the same license key.

The systems and/or methods shown in FIGS. 1-21 and described above can be used to detect if there are other e-book readers that have the same license key entered into it. This prevents the digital content meant for one user from being decrypted and enjoyed by another user. In other words, this feature prevents piracy of digital goods.

The user may uninstall the e-book reader from one computer and install on another computer. As long as two installations of the e-book reader are not detected with the same private license key, there will be no licensing issues. Users may also backup their digital content and license keys just like other files and may change computers and platforms as often as they wish. The consumers may even transfer ownership of a license key along with all the content purchased using that license key to another person. The algorithm for decrypting the content is preferably kept secret, similar to the way DVDs can be played but not copied by personal computers.

The method described herein may be applied to all forms of digital content. Although music and e-books are the most common, other content such as video, images and content-subscriptions may also be protected.

Figure 25:
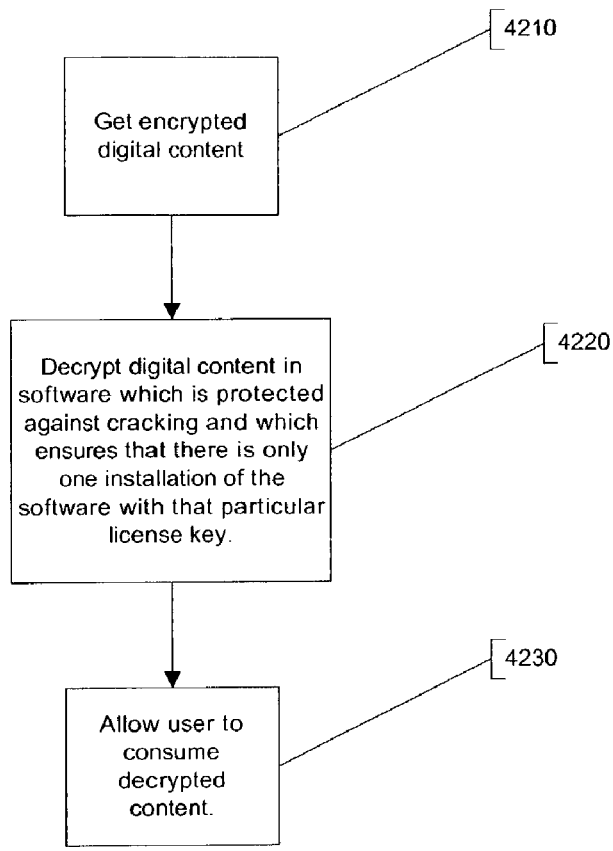
FIG. 25 is a flowchart illustrating a method for decrypting and reading digital content.
Figure 26:
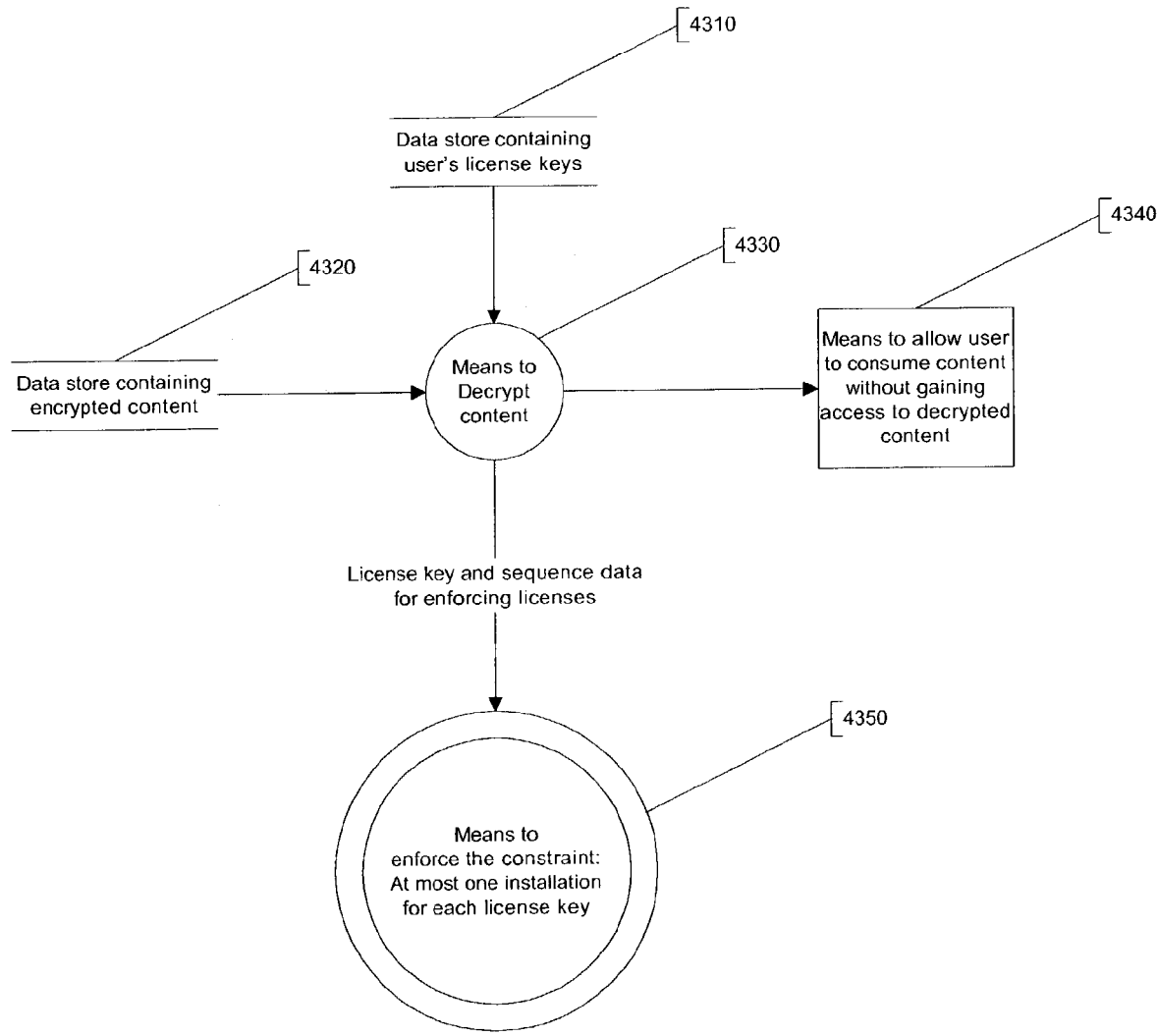
FIG. 26 is a schematic diagram of software for decrypting and reading digital content.
Figure 27:
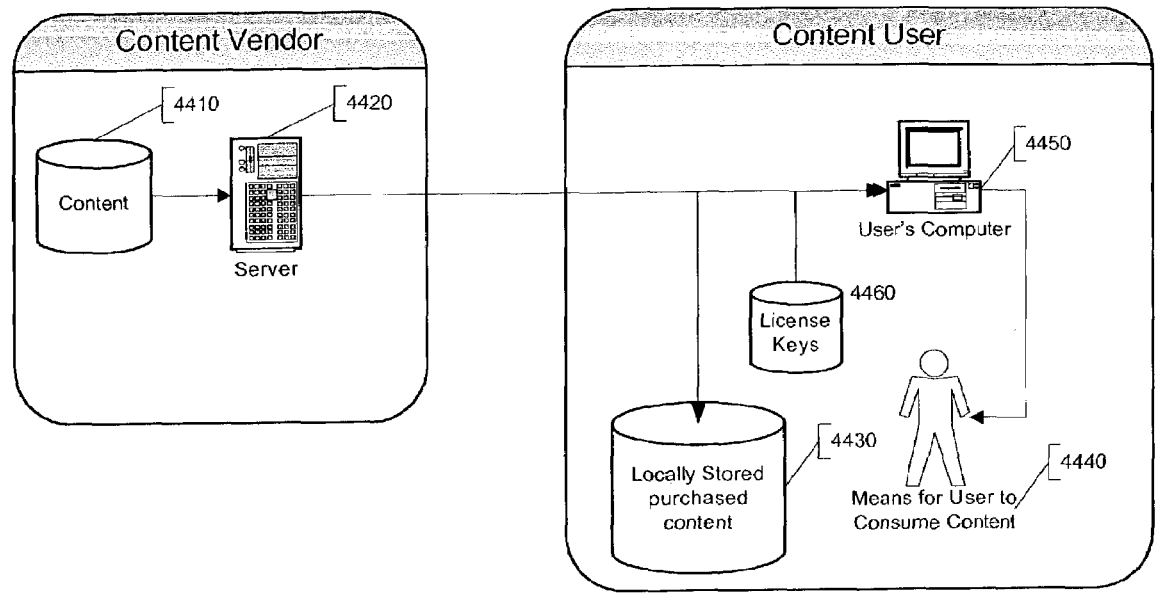
FIG. 27 is a schematic diagram of a system for monitoring licensed digital goods including digital content.
Figure 28:
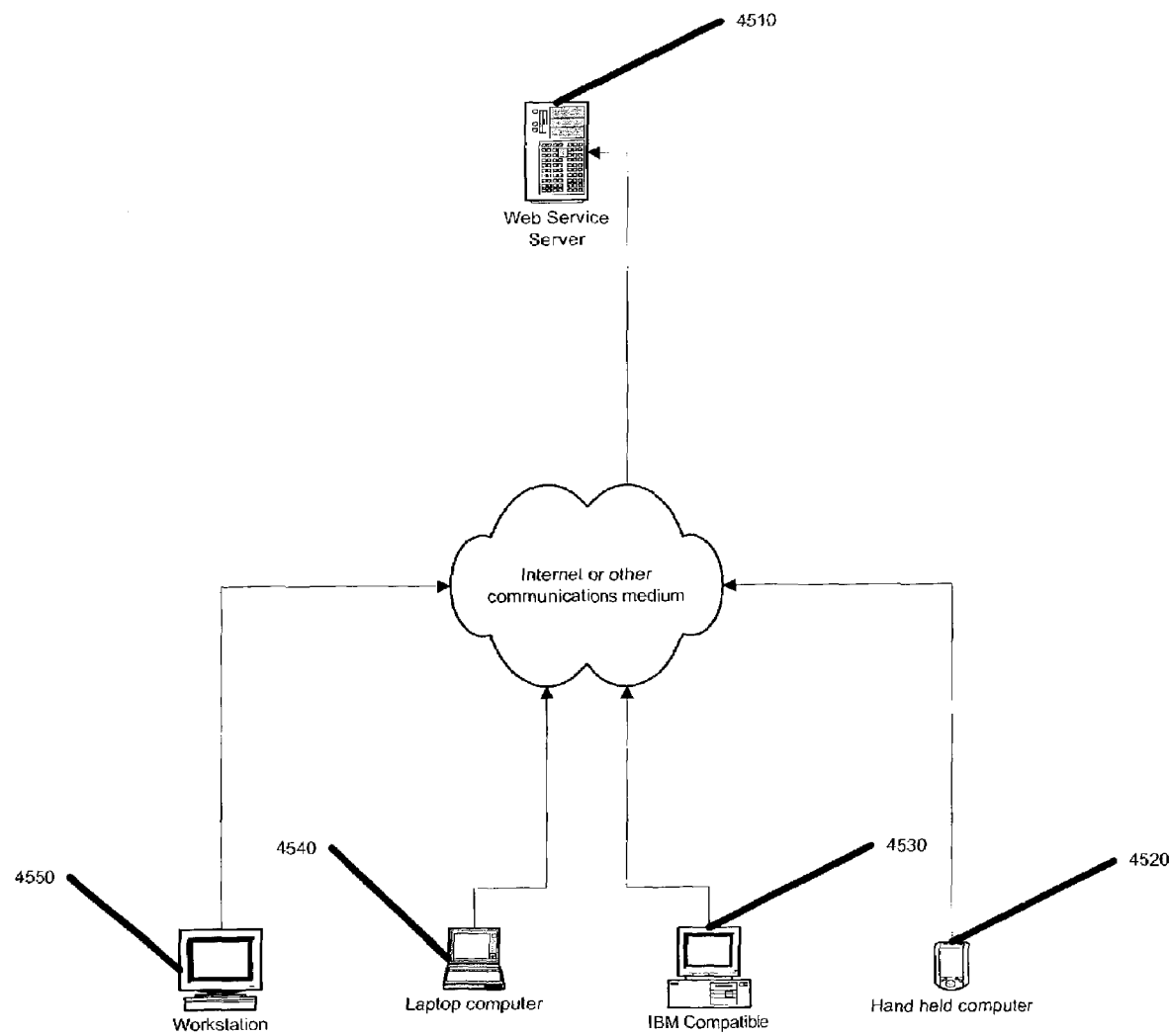
FIG. 28 is a schematic diagram of a system for monitoring web services.

Referring to FIGS. 24-27, one method of monitoring a licensed digital good having digital content, such as an e-book or music, is described in greater detail. FIG. 27 shows the interaction between the content vendor and the content user. A vendor supplies content 4410 through a server 4420. The consumer downloads the content and stores it 4430 on a computer 4450 for use. The content received by the user is encrypted in such a way that it can only be decrypted by a license key. The user stores his/her license keys 4460 in the computer 4450. When the user uses the content, it is decrypted.

Figure 24:
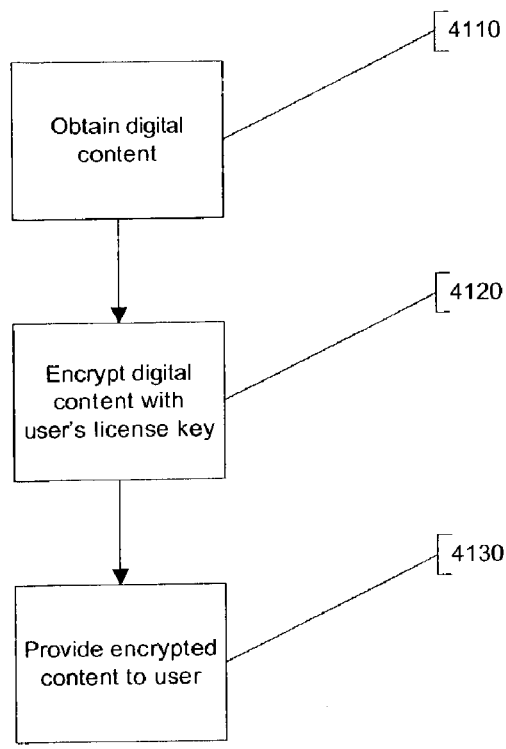
FIG. 24 is a flowchart illustrating a method for delivering protected digital media content.

FIG. 24 shows the steps followed by the content vendor. The vendor takes the content purchased by the consumer, step 4110, encrypts it, step 4120, and gives the encrypted content to user, step 4130. The encrypted content may be stored on the user's machine locally 4320.

FIG. 26 shows one embodiment of the software for decrypting and reading the encrypted content. The software on the user's machine includes code 4330 for decrypting the content and code 4340 for allowing the user to consume the content without being able to copy it out. For example, if the content were music, then the software would decode the music and play it without giving the user the decrypted music file. In addition, the license keys that are used to decrypt the content are also stored locally in a data store 4310. There is also code 4350 to ensure that no two installations of the software have the same license keys 4350, for example, using one or more of the sub-processes described in FIG. 1-21.

FIG. 25 shows the steps followed by the user's software running on the device 4450. First, the software loads the encrypted content, step 4210. Then the software decrypts the encrypted content using the user's license key, step 4220. The software also sends data to a license server to assist in monitoring use of the licensed digital goods, for example, according to one or more of the sub-processes shown in FIG. 1-21. Next the software helps the user consume the content without being able to extract the decrypted content, step 4230.

Referring to FIG. 28, another method of monitoring licensed digital goods can be used to protect Web services. A web service 4510 includes one or more web pages being accessed by clients 4520, 4530, 4540, and 4550. Each client has a distinct license key or password used to access the web services. If two or more clients use the same license key, then the service is being used without a license or authorization. The race condition protocols discussed earlier (FIG. 1-21) are used to ensure that there is only one client with any given license key using the web services. Clients may be implemented using full-featured programming languages such as Java and C++ or scripting languages that run in a browser sand-box such as Javascript. If run within a browser, clients can store their state between invocations using mechanisms such as cookies.

Although the description above contains many specifics, these should not be construed as limiting the scope of the invention but as merely providing illustrations of some of the presently preferred embodiments of this invention. Modifications and substitutions by one of ordinary skill in the art are considered to be within the scope of the present invention, which is not limited except by the following claims.

The invention claimed is:

1. A computerized method for monitoring use of a licensed digital good to determine if said licensed digital good has multiple instances on multiple digital devices, said method comprising:

associating a licensed digital good with a shared resource such that each instance of said licensed digital good is associated with and communicates with said shared resource repeatedly and with a known interval of time having elapsed between each communication;

updating said shared resource with a time associated with each communication from said each instance of said licensed digital good associated with said shared resource when said each instance of said licensed digital good is used on one of said digital devices;

determining if any communication was received with less than said known interval of time having elapsed since the previous communication, such an occurrence being a race condition indicating that multiple instances of said licensed digital good are being used;

if a race condition has occurred, determining that use of said multiple instances of said licensed digital good is a license violation; and if a race condition has not occurred, continuing to monitor use of the licensed digital good.

2. The computerized method of claim 1 wherein said licensed digital good is software, and wherein an update of said shared resource is initiated when each instance of said software is run on one of said digital devices.

3. The computerized-method of claim 1 wherein said licensed digital good is a digital media file, and wherein an update of said shared resource is initiated when each instance of said digital media file is read by a digital media reader on said digital device.

4. The computerized method of claim 1 wherein said licensed digital good is a web page provided by a web service, and wherein an update of said shared resource is initiated when said web page is read by a web browser on said digital device.

5. The computerized method of claim 1 wherein said licensed digital good has a license key allowing access to said licensed digital good, and wherein said shared resource corresponds to said license key.

6. The computerized method of claim 1 further comprising the step of counting a number of uses of said multiple instances of said digital good.

7. The computerized method of claim 1 further comprising the step of notifying a user/licensee in the event of a license violation.

8. The computerized method of claim 1 further comprising the step of: counting a number of uses of said instances of said digital good; and determining a number of additional licenses needed for said uses of said instances of said digital good.

9. The computerized method of claim 8 further comprising the step of automatically selling additional licenses as needed.

10. A computerized method for monitoring use of a licensed digital good to determine if said licensed digital good has multiple instances on multiple digital devices, said method comprising:

associating a licensed digital good with a shared resource such that each instance of said licensed digital good is associated with and communicates with said shared resource;

establishing a well-defined rule having a property that if any two sequences that follow said well-defined rule are combined by inter-leaving some of the individual items from each sequence, then the combined sequence does not follow said well-defined rule;

generating a sequence of data that complies with the well-defined rule;

sending said sequence of data from said each instance of said licensed digital good to said shared resource when said each instance of said licensed digital good is used on one of said digital devices, wherein if multiple instances of said licensed digital good send said sequence of data, at least a portion of said sequence of data from one of said multiple instances of said licensed digital good is interleaved with at least a portion of said sequence of data from another of said multiple instances of said licensed digital good;

detecting if data received at said shared resource does not comply with said well-defined rule, such an occurrence indicating a race condition;

if a race condition has occurred, determining that use of said multiple instances of said licensed digital good is a license violation; and if a race condition has not occurred, continuing to monitor said licensed digital good.

11. A machine-readable medium including executable instructions stored thereon, the executable instructions causing a computer system to perform the method comprising:

associating a licensed digital good with a shared resource such that each instance of said licensed digital good is associated with and communicates with said shared resource repeatedly and with a known interval of time having elapsed between each communication;

updating said shared resource with a time associated with each communication from said each instance of said licensed digital good associated with said shared resource when said each instance of said licensed digital good is used on one of said digital devices;

determining if any communication was received with less than said known interval of time having elapsed since the previous communication, such an occurrence being a race condition indicating that multiple instances of said licensed digital good are being used;

if a race condition has occurred, determining that use of said multiple instances of said licensed digital good is a license violation; and if a race condition has not occurred, continuing to monitor use of the licensed digital good.

12. A machine-readable medium including executable instructions stored thereon, the executable instructions causing a computer system to perform the method comprising:

associating a licensed digital good with a shared resource such that each instance of said licensed digital good is associated with and communicates with said shared resource;

establishing a well-defined rule having a property that if any two sequences that follow said well-defined rule are combined by inter-leaving some of the individual items from each sequence, then the combined sequence does not follow said well-defined rule;

generating a sequence of data that complies with the well-defined rule;

sending said sequence of data from said each instance of said licensed digital good to said shared resource when said each instance of said licensed digital good is used on one of said digital devices, wherein if multiple instances of said licensed digital good send said sequence of data, at least a portion of said sequence of data from one of said multiple instances of said licensed digital good is interleaved with at least a portion of said sequence of data from another of said multiple instances of said licensed digital good;

detecting if data received at said shared resource does not comply with said well-defined rule, such an occurrence indicating a race condition;

if a race condition has occurred, determining that use of said multiple instances of said licensed digital good is a license violation; and if a race condition has not occurred, continuing to monitor said licensed digital good.

* * * * *